(12) United States Patent
Ohmura

(10) Patent No.: US 12,008,992 B2
(45) Date of Patent: Jun. 11, 2024

(54) GENERATING DIALOG RESPONSES FROM DIALOG RESPONSE FRAME BASED ON DEVICE CAPABILITIES

(71) Applicant: Sony Group Corporation, Tokyo (JP)

(72) Inventor: Junki Ohmura, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 423 days.

(21) Appl. No.: 17/414,331

(22) PCT Filed: Jan. 10, 2020

(86) PCT No.: PCT/JP2020/000581
§ 371 (c)(1),
(2) Date: Jun. 16, 2021

(87) PCT Pub. No.: WO2020/153146
PCT Pub. Date: Jul. 30, 2020

(65) Prior Publication Data
US 2022/0051673 A1 Feb. 17, 2022

(30) Foreign Application Priority Data
Jan. 23, 2019 (JP) ................... 2019-008895

(51) Int. Cl.
*G10L 15/22* (2006.01)
*G06F 40/151* (2020.01)
(Continued)

(52) U.S. Cl.
CPC ............. *G10L 15/22* (2013.01); *G10L 13/08* (2013.01); *G10L 15/01* (2013.01); *G10L 2015/223* (2013.01)

(58) Field of Classification Search
CPC ............... G10L 15/22; G10L 2015/226; G10L 2015/227; G10L 2015/228; H04L 67/04; G06F 40/151
(Continued)

(56) References Cited

U.S. PATENT DOCUMENTS 5,886,694 A * 3/1999 Breinberg ................. G06F 8/38
715/788
5,926,790 A * 7/1999 Wright ..................... G10L 15/22
704/275
(Continued)

FOREIGN PATENT DOCUMENTS

EP 1615124 A1 * 1/2006 ........... G06F 9/4443
JP 2005-25602 A 1/2005
(Continued)

OTHER PUBLICATIONS

International Search Report and Written Opinion dated Mar. 24, 2020, received for PCT Application PCT/JP2020/000581, Filed on Jan. 10, 2020, 9 pages including English Translation.

*Primary Examiner* — Martin Lerner
(74) *Attorney, Agent, or Firm* — XSENSUS LLP

(57) ABSTRACT

An information processing apparatus acquires a capability for each of agent devices that each output a dialog response, generates the dialog response corresponding to the capability, based on a general-purpose dialog response frame, and deploys the dialog response to each of the agent devices. The capability indicates a combination of interfaces available for each of the agent devices. The apparatus applies to the general-purpose dialog response frame a conversion template including plural templates that convert values of parameters of the general-purpose dialog response frame into converted forms in accordance with the combination of interfaces available for each of the agent devices, and generate the dialog response for each of the agent devices, (Continued)

using the converted forms converted from the values of the parameters of the general-purpose dialog response frame.

8 Claims, 15 Drawing Sheets

(51) Int. Cl.
*G10L 13/08* (2013.01)
*G10L 15/01* (2013.01)

(58) Field of Classification Search
USPC .................. 704/270, 270.1, 275; 715/236
See application file for complete search history.

(56) References Cited

U.S. PATENT DOCUMENTS

| | | | | |
|---|---|---|---|---|
| 6,738,803 | B1* | 5/2004 | Dodrill | ............... G10L 15/26 |
| | | | | 715/236 |
| 2003/0130864 | A1* | 7/2003 | Ho | ..................... H04L 67/04 |
| | | | | 705/1.1 |
| 2005/0256717 | A1* | 11/2005 | Miyata | ............ G10L 15/1822 |
| | | | | 704/270 |
| 2010/0174545 | A1* | 7/2010 | Otani | ................... G10L 15/26 |
| | | | | 704/260 |
| 2011/0106537 | A1* | 5/2011 | Funyak | ................ G10L 15/22 |
| | | | | 704/260 |
| 2016/0041811 | A1* | 2/2016 | Parundekar | ........... G10L 15/22 |
| | | | | 704/275 |
| 2016/0179464 | A1* | 6/2016 | Reddy | ................. G10L 15/22 |
| | | | | 715/728 |
| 2019/0198016 | A1* | 6/2019 | McKenzie | ............ G10L 15/22 |

FOREIGN PATENT DOCUMENTS

| | | |
|---|---|---|
| JP | 2013-517566 A | 5/2013 |
| JP | 2018-509014 A | 3/2018 |
| JP | 2018-55422 A | 4/2018 |

* cited by examiner

GENERATING DIALOG RESPONSES FROM DIALOG RESPONSE FRAME BASED ON DEVICE CAPABILITIES

CROSS-REFERENCE TO RELATED APPLICATIONS

The present application is based on PCT filing PCT/JP2020/000581, filed Jan. 10, 2020, which claims priority to JP 2019-008895, filed Jan. 23, 2019, the entire contents of each are incorporated herein by reference.

TECHNICAL FIELD

The present technology relates to an information processing apparatus and an information processing method, in particular relates to an information processing apparatus and an information processing method capable of providing a dialog response more appropriately.

BACKGROUND ART

In recent years, dialog agents that conduct dialogs with users have been used. An agent device mounted with this type of dialog agent has various types of expression means such as a speaker, a display, and a body. Thus, even if the same dialog agent is used at a backend, an interface with a user may differ depending on the agent device.

In such a case, it is necessary to design a dialog so as to be suitable for a combination of expression means held by each agent device, which is troublesome for a developer who develops a dialog response.

For example, as a technology for reducing labor of the developer, a technology disclosed in Patent Document 1 has been proposed. In Patent Document 1, a pre-designed dialog DB and dialog generation means that calculates a correlation between words are used for an input sentence, to determine dialogs to be output from the designed dialog DB and the dialog generation means.

CITATION LIST

Patent Document

Patent Document 1: JP 2005-25602 A

SUMMARY OF THE INVENTION

Problems to be Solved by the Invention

In this way, for the developer who develops a dialog response, it is troublesome to design a dialog according to expression means held by each agent device. On the other hand, the agent device is also required to provide a user with a dialog response that makes maximum use of the expression means held by the agent device.

The present technology has been made in view of such a situation, and can provide a dialog response more appropriately.

Solutions to Problems

An information processing apparatus according to an aspect of the present technology includes a processing unit that acquires a capability for each device that outputs a dialog response, generates the dialog response corresponding to the acquired capability from a dialog response frame used as a seed at a time of generation of the dialog response, and deploys the generated dialog response to each device.

An information processing method according to an aspect of the present technology is performed by an information processing apparatus, and the information processing method includes: acquiring a capability for each device that outputs a dialog response; generating the dialog response corresponding to the acquired capability from a dialog response frame used as a seed at a time of generation of the dialog response; and deploying the generated dialog response to each device.

In the information processing apparatus and the information processing method according to an aspect of the present technology, a capability for each device that outputs a dialog response is acquired, the dialog response corresponding to the acquired capability is generated from a dialog response frame used as a seed at a time of generation of the dialog response, and the generated dialog response is deployed to each device.

An information processing apparatus according to an aspect of the present technology includes a processing unit that acquires, in a case where a dialog response event occurs, the dialog response generated corresponding to a capability from a dialog response frame used as a seed at a time of generation of the dialog response, acquires context information regarding context, selects the dialog response that matches the context from the acquired dialog responses, and outputs the selected dialog response.

An information processing method according to an aspect of the present technology is performed by an information processing apparatus, and the information processing method includes: acquiring, in a case where a dialog response event occurs, the dialog response generated corresponding to a capability from a dialog response frame used as a seed at a time of generation of the dialog response; acquiring context information regarding context; selecting the dialog response that matches the context from the acquired dialog responses; and outputting the selected dialog response.

In the information processing apparatus and the information processing method according to an aspect of the present technology, in a case where a dialog response event occurs, the dialog response generated corresponding to a capability is acquired from a dialog response frame used as a seed at a time of generation of the dialog response, context information regarding context is acquired, the dialog response that matches the context is selected from the acquired dialog responses, and the selected dialog response is output.

Note that the information processing apparatus according to an aspect of the present technology may be an independent apparatus or an internal block constituting one apparatus.

MODE FOR CARRYING OUT THE INVENTION

Figure 1:
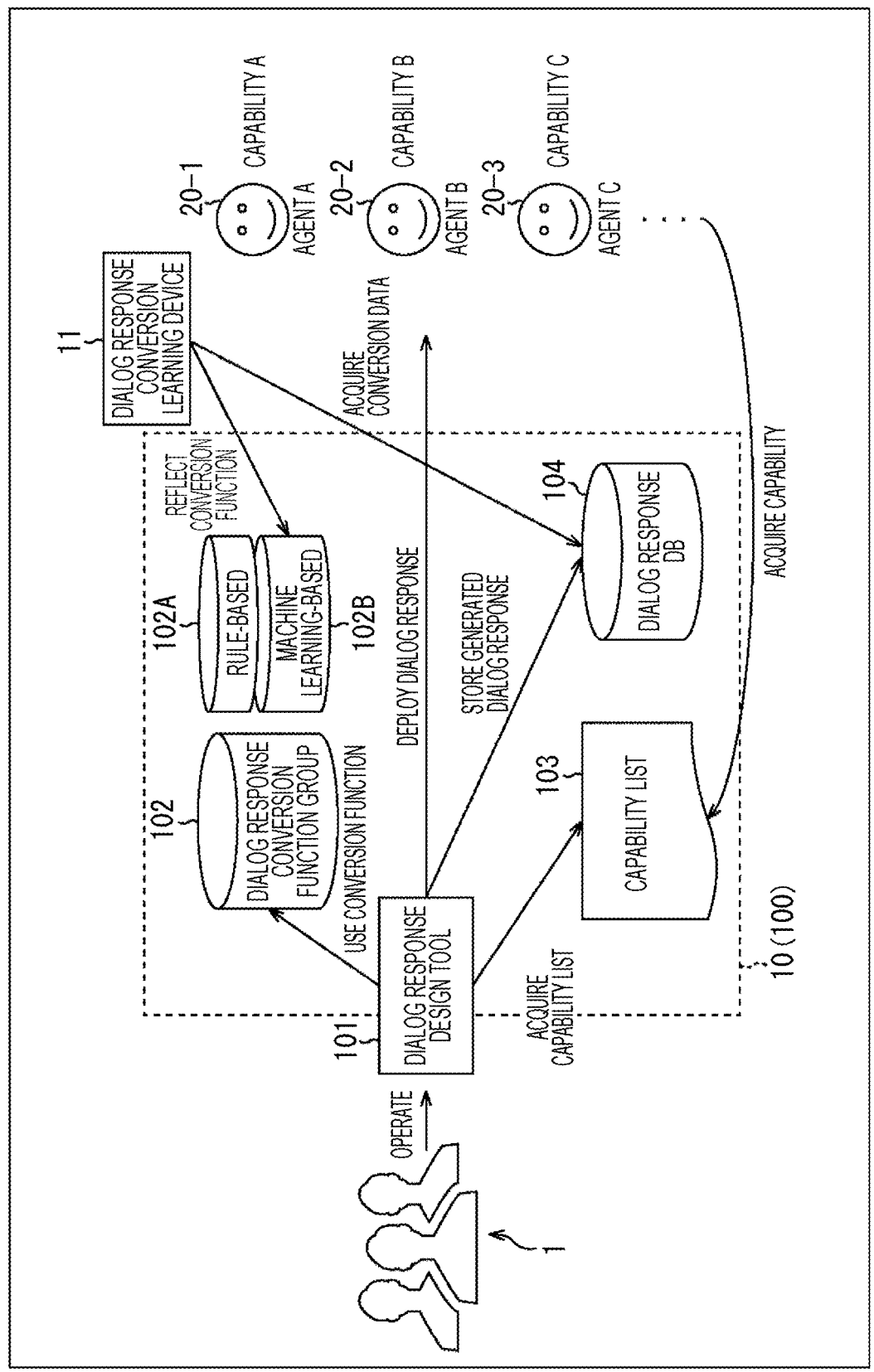
FIG. 1 is a diagram illustrating a configuration example of an embodiment of a dialog response design device as an information processing apparatus to which the present technology is applied.

Hereinafter, embodiments of the present technology will be described with reference to the drawings. Note that the description will be made in the following order.

1. Embodiments of Present Technology
2. Modification
3. Configuration of Computer 1. Embodiments of Present Technology (Definition of Terms)

First, before describing detailed contents of the present technology, terms used in the present disclosure will be defined.

A "dialog" is an act of exchanging information such as utterances between people or with a machine. In many cases, the exchange is performed not once, but a plurality of times. In that case, it is necessary to select an exchange that takes exchanges so far into consideration. For example, there are forms of the dialog such as one-to-one, one-to-many, and many-to-many. Note that, in the present disclosure, the dialog and interaction are treated as synonyms.

A "dialog system" is a system capable of exchanging some information (conducting a dialog) with a user. Here, in general, a natural language using text, utterances, or the like is often used for the exchange, but the use is not necessarily limited to a language. For example, gestures or eye contacts may be used.

A "dialog agent" is a service mounted with the dialog system and deployed. As a method of providing the dialog agent, for example, the dialog agent may actually have a display device or a body as an electronic device, or may be provided as a graphical user interface (GUI) as an application or the like.

A "dialog response" is a reaction to an utterance or the like from one (for example, a user) by the other (for example, the dialog system) in a dialog between the dialog system and the user. Examples of the reaction include an utterance response, a screen response, and the like, and these responses may be combined.

Note that, in the following description, the dialog system is also referred to as "S", and the user is also referred to as "U". In addition, since the "utterance response (voice response)" is achieved by reading aloud text using text to speech (TTS), for example, the "utterance response (voice response)" is also referred to as "TTS". Since the "screen response" is achieved by displaying a GUI, for example, the "screen response" is also referred to as "GUI".

A specific example of a dialog response:
U: "Tell me the weather"
S: "Weather is here" (weather GUI is also displayed)

A "capability" is expression means of various dialog responses, which is possessed by an agent device mounted with the dialog agent. Here, the "capability" includes "interface information" and "capability information".

The "interface information" is information regarding an interface of the agent device. The "capability information" is information regarding ability of the interface.

A "dialog response frame" is a dialog response design document for the dialog system. In the following description, the dialog response frame is assumed to be synonymous with a "general-purpose dialog response". Here, a "specific dialog response" for the "general-purpose dialog response" is also defined. The "specific dialog response" is assumed to refer to specific dialog response data actually held by each dialog agent.

Hereinafter, details of the present technology will be described with reference to the drawings.

Configuration of Information Processing Apparatus

FIG. 1 is a diagram illustrating a configuration example of an embodiment of a dialog response design device as an information processing apparatus to which the present technology is applied.

In FIG. 1, a dialog response design device 10 is a device (dialog response generation device) that designs (generates) a dialog response and deploys the dialog response to agent devices 20-1 to 20-N. The dialog response design device 10 includes a dialog response design tool 101, a dialog response conversion function group 102, a capability list 103, and a dialog response DB 104.

The dialog response design tool 101 is a tool (GUI tool) handled by a developer 1 involved in development of a dialog agent. Examples of the dialog response design tool 101 include a web application and a client tool, and here, the dialog response design tool 101 has a function for consistently designing a dialog response. In addition, examples of the developer 1 include an application developer, a designer (including an interaction designer and a UI designer), and a scenario writer.

Specifically, examples of functions of the dialog response design tool 101 include the following functions (a1) to (a5).

(a1) Acquisition of deployable capabilities and a deployment agent list (a2) Design of a dialog response (either a general-purpose dialog response or a specific dialog response may be designed)

(a3) Generation of a dialog response to an optional capability from a general-purpose dialog response or a specific dialog response (a dialog response conversion module is used)

(a4) Correction of an automatically generated dialog response (a5) Storage of a generated dialog response and deployment of the dialog response to each of the agent devices 20-1 to 20-N (N: integer of 1 or more)

The dialog response conversion function group 102 holds mapping functions for generating, when the optional capability list 103 is given for a general-purpose dialog response or a specific dialog response, a specific dialog response using a capability in the capability list 103.

The mapping functions includes a rule-based one which is manually adjusted and a machine learning-based one by machine learning. The rule-based mapping function is stored in a rule-based DB 102A, and the machine learning-based mapping function is stored in a machine learning-based DB 102B.

The capability list 103 is a list of capabilities that can be used by the dialog response design tool 101. The capability list 103 has a filter function such as displaying, according to an assumed service, only capabilities that the service corresponds to.

The dialog response DB 104 stores (data of) a dialog response generated by the dialog response design tool 101. For example, in the dialog response DB 104, a dialog response before conversion and input information at that time can be recorded together with the generated dialog response. The input information includes, for example, capabilities and context information.

The data stored in the dialog response DB 104 can be used by a machine learning-based learning device (dialog response conversion learning device 11), or can be used by the developer 1 to analyze conversion information.

In addition, with the functions of the dialog response design tool 101, it is possible to access the data stored in the dialog response DB 104, or to provide external access by using a general-purpose database (for example, an open-source relational database management system (RDBMS) or a commercial RDBMS).

The dialog response conversion learning device 11 includes a model capable of generating a dialog response by using mapping information (mapping function). In the trained model, a function of a conversion unit can be registered as a function in the dialog response conversion function group 102.

The agent device 20-1 is an electronic device mounted with a dialog agent. Examples of the agent device 20-1 include a smartphone, a smart speaker, a speaker with a display, a television receiver, a robot, a wearable device, a tablet terminal, a display device, a personal computer, and other household electrical appliances.

Each of the agent devices 20-2 to 20-N is configured as an electronic device mounted with a dialog agent, similarly to the agent device 20-1. Note that, in the following description, the agent devices 20-1 to 20-N are simply referred to as the agent devices 20 in a case where it is not particularly necessary to distinguish the agent devices 20-1 to 20-N.

Here, it is assumed that the agent devices 20-1 to 20-N have different capabilities, and that the agent devices 20-1 to 20-N are mounted with the same dialog agent (service). However, different service groups may be registered so that it is possible to switch to a desired service for design.

For example, it is assumed that the same character is deployed as a dialog agent (service) to each of the agent devices 20-1 to 20-N having various capabilities.

In addition, although a capability includes interface information and capability information, in the agent devices 20-1 to 20-N, a case is assumed where the capability information (for example, a display method or a screen size) may be different even if the agent devices 20-1 to 20-N have the same interface information (for example, a display).

Note that the dialog response design device 10 is an information processing apparatus, and is configured as, for example, a computer (for example, a computer 1000 in FIG. 15) such as a personal computer, a workstation, or a dedicated console. For example, in the dialog response design device 10, the dialog response design tool 101 is implemented by a processing unit 100 (for example, a CPU 1001 in FIG. 15) executing a program.

In addition, in the dialog response design device 10, the dialog response conversion function group 102 and the dialog response DB 104 are stored in a storage device (for example, a recording unit 1008 in FIG. 15) such as a hard disk drive (HDD) or a semiconductor memory. Furthermore, the capability list 103 is acquired by a communication unit (for example, a communication unit 1009 in FIG. 15) such as a communication module performing wireless communication or wired communication conforming to a predetermined standard with each of the agent devices 20-1 to 20-N, and exchanging various types of information.

Flow of Dialog Response Design Processing

Next, a flow of dialog response design processing executed by the dialog response design tool 101 will be described with reference to a flowchart of FIG. 2.

In Step S101, the dialog response design tool 101 acquires and selects the capability list 103.

In Step S102, the dialog response design tool 101 determines, for example, whether to use a general-purpose dialog response in response to an operation from the developer 1, or the like.

In a case where it is determined in the determination processing of Step S102 that the general-purpose dialog response is to be used, the processing proceeds to Step S103. In Step S103, the dialog response design tool 101 generates a general-purpose dialog response frame.

In addition, in a case where it is determined in the determination processing of Step S102 that the general-purpose dialog response is not to be used, the processing proceeds to Step S104. In Step S104, the dialog response design tool 101 determines, for example, whether to generate a new response in response to an operation from the developer 1, or the like.

In a case where it is determined in the determination processing of Step S104 that the new response is to be generated, the processing proceeds to Step S105. In Step S105, the dialog response design tool 101 generates a specific dialog response.

In addition, in a case where it is determined in the determination processing of Step S104 that the new response is not to be generated, the processing proceeds to Step S106. In Step S106, the dialog response design tool 101 refers to the dialog response DB 104 to acquire and select an existing dialog response.

When the processing of Step S103, S105, or S106 is completed, the processing proceeds to Step S107.

In Step S107, the dialog response design tool 101 selects and generates a dialog response conversion method. Details of the selection and generation of the dialog response conversion method will be described later with reference to, for example, FIG. 4.

In Step S108, the dialog response design tool 101 determines, for example, whether it is necessary to correct the dialog response in response to an operation from the developer 1, or the like.

In a case where it is determined in the determination processing of Step S108 that it is necessary to correct the dialog response, the processing proceeds to Step S109. In Step S109, the dialog response design tool 101 corrects the dialog response.

When the processing of Step S109 is completed, the processing proceeds to Step S110. In addition, in a case where it is determined in the determination processing of Step S108 that it is not necessary to correct the dialog response, the processing proceeds to Step S110.

In Step S110, the dialog response design tool 101 stores the dialog response in the dialog response DB 104.

In Step S111, the dialog response design tool 101 deploys the dialog response to the agent devices 20.

The flow of the dialog response design processing has been described above.

Here, the dialog response design tool 101 is assumed to be a tool provided for, for example, an agent service provider (ASP). It is assumed that the dialog agent here corresponds to the agent devices 20 having various capabilities even if it is one dialog agent.

For example, a dialog agent (service) is deployed to the agent devices 20 having various capabilities, such as a smartphone application, a speaker, or a speaker with a display, while being one dialog agent.

In a case where a dialog response to such an agent device 20 is designed, even if a dialog response to the same user utterance may have the same content, it is necessary to adjust the dialog response according to a capability of each agent device 20, which is very troublesome work for the developer 1.

Therefore, in the dialog response design tool 101, a mechanism is provided in which the general-purpose dialog response frame is used so that it is possible to collectively generate (automatically generate) dialog responses to the agent devices 20 having various capabilities from one general-purpose dialog response frame.

That is, the general-purpose dialog response frame is a frame (file) described in conformity to a specification of a general-purpose dialog response, and the developer 1 can design (automatically design) dialog responses without being conscious of capabilities (expression means) of the agent devices 20 simply by describing the general-purpose dialog response frame.

Figure 3:
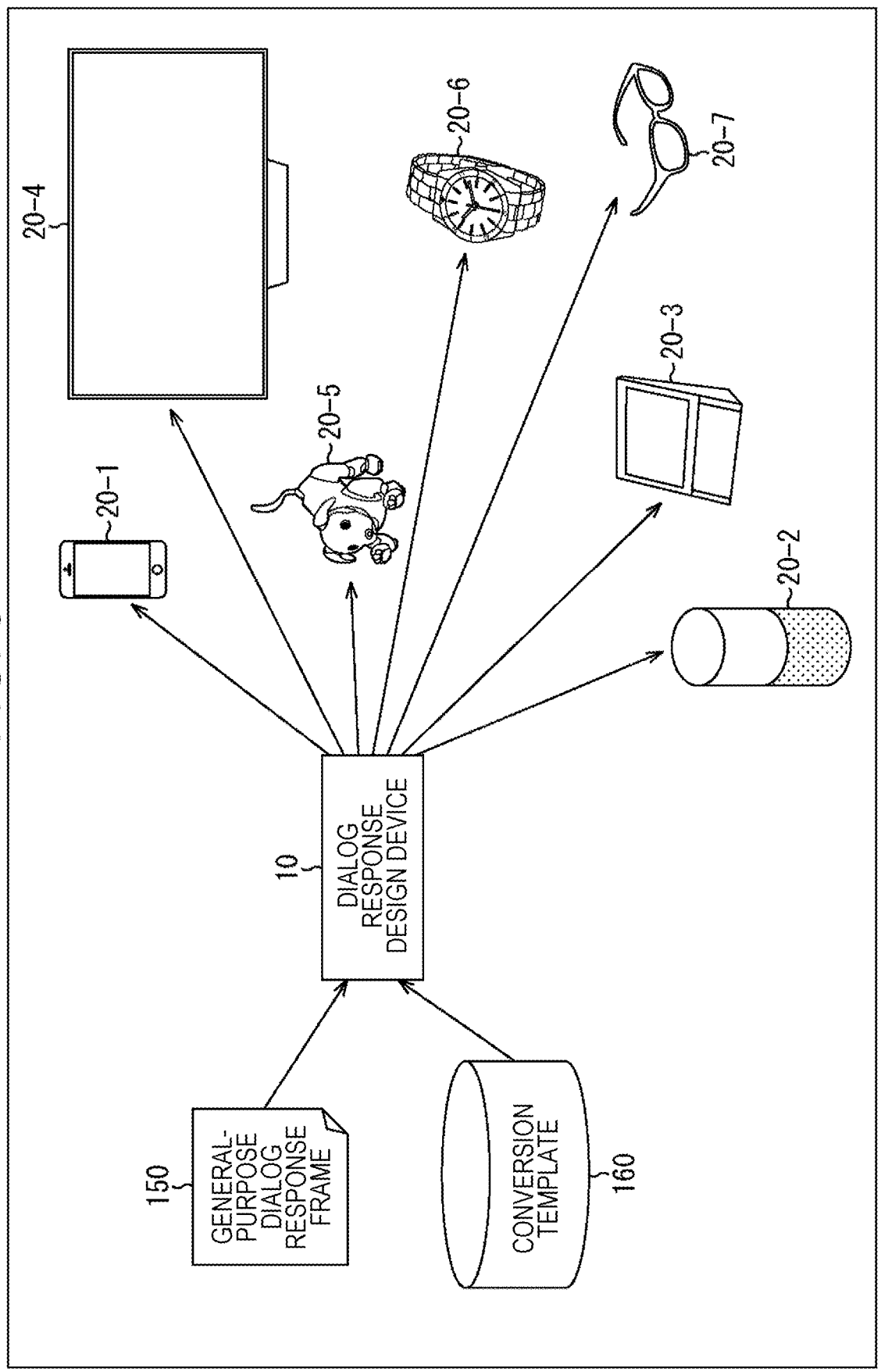
FIG. 3 is a diagram illustrating an example of deployment of a dialog response using a general-purpose dialog response frame.

Example of Deployment of Dialog Response Using General-Purpose Dialog Response Frame FIG. 3 illustrates an example of deployment of a dialog response using the general-purpose dialog response frame.

In FIG. 3, the dialog response design device 10 generates a dialog response by using a general-purpose dialog response frame 150 created by the developer 1 and a conversion template 160 prepared in advance, and deploys the dialog response to the agent devices 20-1 to 20-7.

In the example of FIG. 3, the agent devices 20-1 to 20-7 as deployment destinations have various capabilities. Thus, here, details of the capabilities of the agent devices 20 as the deployment destinations will be described first.

Details of Capabilities

The capabilities include interface information and capability information. Examples of the interface information include information indicating a display, a speaker, a robot, haptics, a message notification, a lamp, and the like. Hereinafter, details of the interface information and capability information corresponding thereto will be indicated in (b1) to (b6).

(b1) Display

The display is specified in a case where, for example, a display device such as a liquid crystal display (LCD) or an organic light emitting diode (OLED) display is included as expression means. Note that the display device may be mounted with a function such as a touch panel.

In a case where the display is specified as the interface information, for example, a display method, a screen size, and touch panel information can be specified as the capability information.

Specifically, the display method, for example, the display method of a GUI, can include information indicating monochrome (for example, black-and-white monochrome) or color. In addition, the screen size may include, in addition to classification of a large size, a medium size, and a small size, information indicating screen resolution such as 640×480, 1920×1080, or 3940×2160, for example. Furthermore, the touch panel information can include information indicating whether or not a touch panel is mounted.

For example, in FIG. 3, for the agent devices 20-1, 20-3, 20-4, and 20-7 (a smartphone, a speaker with a display, a television receiver, and smartglasses), "display" is specified as the interface information, and the display method, the screen size, and the like are specified as the capability information. Here, for example, the screen sizes of "small size" for the smartglasses, "medium size" for the smartphone and the speaker with a display, and "large size" for the television receiver are specified as the capability information.

(b2) Speaker

The speaker is specified in a case where a sound output device that reproduces sounds such as voice and music is included as expression means. The speaker is not limited to monaural or stereo, and may include, for example, a plurality of channels. Note that the plurality of channels includes a directional speaker using a speaker array.

In a case where the speaker is specified as the interface information, for example, a reproduction method and the number of sound channels can be specified as the capability information. Specifically, the reproduction method can include information indicating stereo or monaural, for example.

For example, in FIG. 3, for the agent devices 20-2 and 20-3 (a smart speaker and the speaker with a display), "speaker" is specified as the interface information, and the reproduction method and the like are specified as the capability information. Here, for example, the reproduction methods of "monaural" for the smart speaker and "stereo" for the speaker with a display are specified as the capability information.

Note that, in FIG. 3, since the agent devices 20-1 and 20-4 (the smartphone and the television receiver) have functions to output sound such as voice, "speaker" may be specified as the interface information and "stereo" and the like may be specified as the capability information.

(b3) Robot

The robot is specified in a case where, for example, a device or a machine that has a shape and a function that imitate or approximate those of a person or an animal (pet) and autonomously performs some operation by moving a part of the body mainly by an actuator is included as expression means. Here, the robot is not limited to a robot having a shape of a person or an animal, and includes, for example, a robot arm and a caterpillar car. Thus, the robot also includes a working robot installed in a factory or the like.

In a case where the robot is specified as the interface information, for example, a driving part or a lighting part can be specified as the capability information. Specifically, the driving part can include information indicating a head or a hand, for example. For example, in FIG. 3, for the agent device 20-5 (a dog-shaped robot), "robot" is specified as the interface information, and the driving part such as "head" is specified as the capability information.

Note that although the robot with the body has been described here as an example, a dialog agent expressed by, for example, computer graphics (CG), virtual reality (VR), or augmented reality (AR), which does not have a physical entity, may be included.

(b4) Haptics

The haptics is specified in a case where, for example, a function of reproducing cutaneous sensation of a user in a simulative manner and feeding back the cutaneous sensation by a vibration element or the like is included as expression means. For example, the haptics is implemented by a wearable device of a wristwatch type, a bracelet type, or the like.

In a case where the haptics is specified as the interface information, for example, a pattern and strength of vibration can be specified as the capability information. Specifically, the pattern of vibration can include, for example, information indicating a pattern in which slight vibration occurs or a pattern in which long vibration continues to occur. In addition, the strength of vibration can include, for example, information indicating strong vibration or weak vibration.

For example, in FIG. 3, for the agent devices 20-1 and 20-6 (the smartphone and a smartwatch), "haptics" is specified as the interface information, and the pattern of vibration such as "slight vibration occurs" is specified as the capability information.

(b5) Message Notification

The message notification is specified, for example, in a case where a function of performing notification of a message by using e-mail or an application such as a social networking service (SNS) is included as expression means. The message may include, for example, text, an image, or a moving image.

In a case where the message notification is specified as the interface information, for example, compatible media such as an image and a moving image can be specified as the capability information. For example, in FIG. 3, for the agent devices 20-1 and 20-3 (the smartphone and the speaker with a display), "message notification" is specified as the interface information, and the compatible media, which are "image" and "moving image", are specified as the capability information.

(b6) Lamp

The lamp is specified in a case where, for example, a light source such as a light emitting diode (LED) is included as expression means. Note that it is possible to express various types of information by changing lighting, blinking, color, luminance, and the like by the light source (lamp) such as the LED.

In a case where the lamp is specified as the interface information, for example, a color type, a lighting (blinking) pattern, and luminance can be specified as the capability information. Specifically, for example, information indicating color types such as "red" and "blue", blinking patterns such as lighting at "short intervals" and "long intervals", and luminance such as "bright" and "dark" can be included.

For example, in FIG. 3, for the agent devices 20-5 and 20-6 (the dog-shaped robot and the smartwatch), "lamp" is specified as the interface information, and the color type of "blue" and the lighting pattern of "short intervals" are specified as the capability information.

Note that the capability of each agent device 20 can include one or a plurality of pieces of interface information and one or a plurality of pieces of capability information. Note that it is optional to include the capability information in the capability.

For example, the agent device 20-1 (the smartphone) has "display", "speaker", "haptics", "message notification", and "lamp" as the interface information, and has the capability information for each of the interface information.

In FIG. 3, the dialog response design device 10 uses a general-purpose dialog response frame 150 created by the developer 1 as a seed at the time of generation of dialog responses of various capabilities, and applies the general-purpose dialog response frame 150 to the conversion template 160 prepared in advance. With this configuration, the dialog response design device 10 can generate and deploy a dialog response suitable for each of the agent devices 20-1 to 20-7 having various capabilities.

Figure 4:
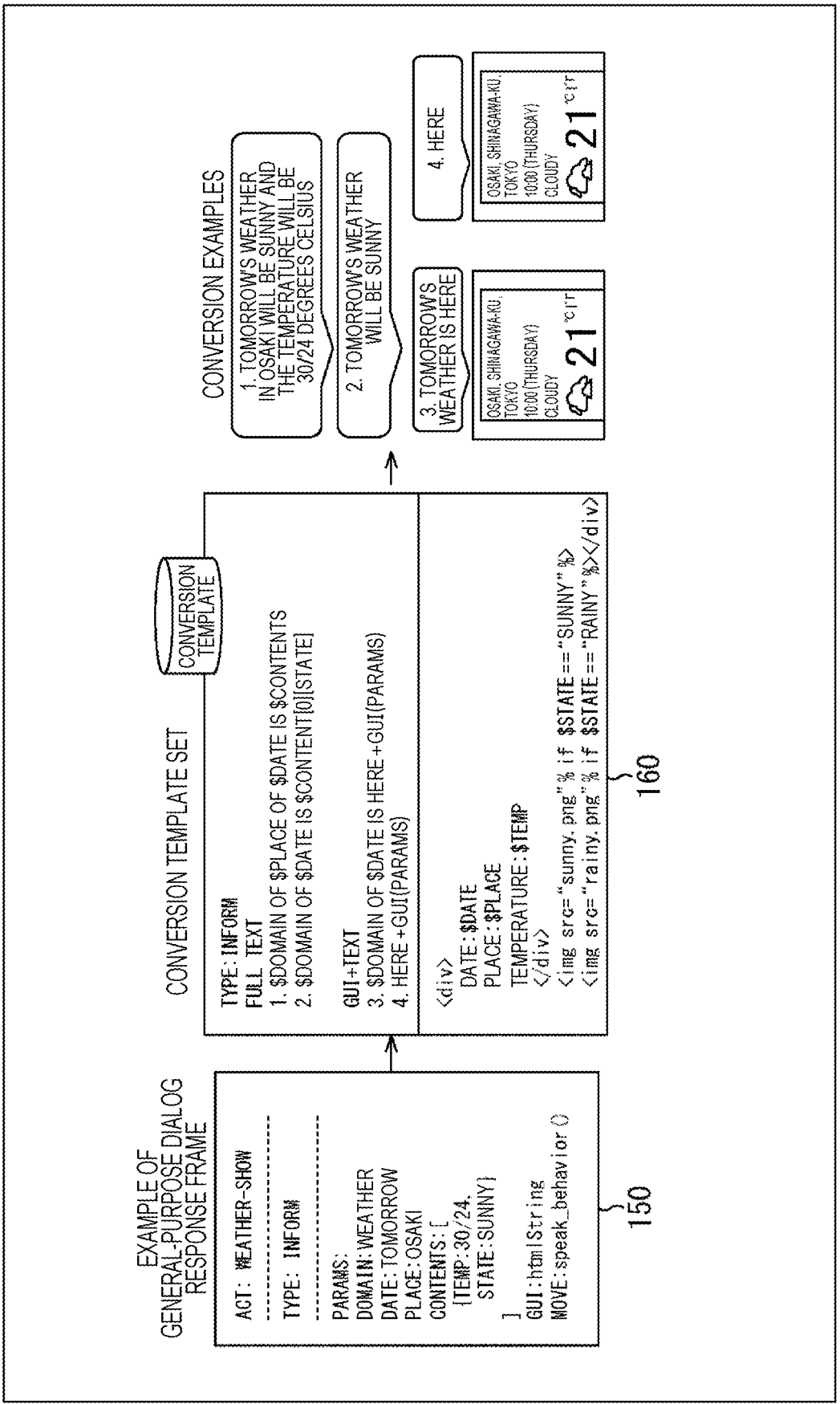
FIG. 4 is a diagram illustrating an example of generation of a dialog response using the general-purpose dialog response frame.

Example of Generation of Dialog Response Using General-Purpose Dialog Response Frame FIG. 4 illustrates an example of generation of a dialog response using the general-purpose dialog response frame.

FIG. 4 illustrates a deployment example of a dialog response (screen response and utterance response: GUI+TTS) using the conversion template 160 as a typical example of generation of a dialog response using the general-purpose dialog response frame 150.

In FIG. 4, the general-purpose dialog response frame 150 describes a dialog act (ACT), a dialog act type (TYPE), and parameters (PRAMS) for a dialog act.

As the dialog act (ACT), an ID for an application function that is actually activated is described. In the general-purpose dialog response frame 150 of FIG. 4, "ACT: WEATHER-SHOW" is described as the dialog act, which means <application name>-<application execution function>, that is, the application name is "WEATHER" and the application execution function is "SHOW". A runtime argument (for example, date information in weather confirmation) is not included here.

As the dialog act type (TYPE), a general type of a dialog act that does not depend on an application is described. Examples of the dialog act type include "INFORM", "ACK", "ASK", "EXPLICIT_CONFIRM", and "IMPLICIT_CONFIRM". In the general-purpose dialog response frame 150 of FIG. 4, "TYPE: INFORM" is described as the dialog act type. As will be described in detail later, "INFORM" refers to an act of providing some information from a system side to a user side.

As the parameters (PARAMS) for a dialog act, parameter information required at the time of execution of a dialog act is described. The parameters (PARAMS) vary depending on the dialog act and can be mandatory or optional. In the general-purpose dialog response frame 150 of FIG. 4, "DOMAIN: Weather", "DATE: Tomorrow", "PLACE: Osaka", and "CONTENTS: [{TEMP: 30/24, STATE: Sunny}]" are described as the parameters (weather information).

In FIG. 4, the conversion template 160 is for generating a specific dialog response from the general-purpose dialog response frame 150. The conversion template 160 is designed for each combination of capabilities and can generate various dialog responses.

The conversion template 160 indicates an example of a case where the dialog act type (TYPE) is "INFORM". Since "INFORM" does not depend on the dialog act as described above, "INFORM" is designed to be used also for other dialog acts of "INFORM". The conversion template 160 receives variables (for example, $DATE, $DOMAIN, and the like) and can output a final dialog response by receiving input of values of the parameters (PARAMS) of the general-purpose dialog response frame 150.

In FIG. 4, two patterns of the conversion template 160, which are FULL TEXT and GUI+TEXT, are prepared. Here, FULL TEXT converts the values of the received input parameters into text only. In the conversion template 160, two types of FULL TEXT conversion templates, which are FULL TEXT 1 and FULL TEXT 2, are prepared.

FULL TEXT

1. $DOMAIN of $PLACE of $DATE is $CONTENTS
2. $DOMAIN of $DATE is $CONTENTS[0][STATE]

In addition, for example, when a web application can be executed, the conversion template 160 may be applied by using a hypertext markup language (HTML) document as a GUI element. In the HTML document, parameters (PARAMS) can be received as in the case described above, and in addition, a content may be switched according to a value of an appropriate variable.

Here, GUI+TEXT converts the values of the received input parameters into the GUI and text. In the conversion template 160, two types of GUI+TEXT conversion templates, which are GUI+TEXT 3 and GUI+TEXT 4, are prepared.

GUI+TEXT

3. $DOMAIN of $DATE is here+GUI (PARAMS)
4. Here+GUI (PARAMS)
<div>
Date: $DATE
Place: $PLACE
Temperature: $TEMP
</div>
<img src="sunny.png" % if$STATE=="Sunny" %>
<img src="rainy.png" % if$STATE=="Rainy" %></div>

In the example of the GUI+TEXT conversion template, a weather icon (for example, "sunny.png" or "rainy.png") is switched according to a character string specified by $STATE (for example, "Sunny" or "Rainy").

In FIG. 4, in a conversion example on the right side of the figure, dialog responses corresponding to various capabilities are generated via the conversion template 160.

For example, for an agent device 20 having the capability of "speaker" as the interface information, the FULL TEXT conversion template (FULL TEXT 1 or FULL TEXT 2) is applied in the conversion template 160 so that the values of the received input parameters are converted into text only. Then, the text obtained by the conversion is converted into voice by a text to speech function (TTS), and the voice is output as a dialog response (utterance response).

Specifically, by applying FULL TEXT 1, an utterance response that says "Tomorrow's weather in Osaki will be sunny and the temperature will be 30/24 degrees Celsius" is output as a dialog response. In addition, by applying FULL TEXT 2, an utterance response that says "Tomorrow's weather will be sunny" is output as a dialog response.

In addition, for example, for an agent device 20 having the capabilities of "display" and "speaker" as the interface information, the GUI+TEXT conversion template (GUI+TEXT 3 or GUI+TEXT 4) is applied in the conversion template 160 so that the values of the received input parameters are converted into the GUI and text. Then, the text obtained by the conversion is converted into voice, and the voice is output as dialog responses (screen response and utterance response) together with the GUI.

Specifically, by applying GUI+TEXT 3, an utterance response that says "Tomorrow's weather is here" together with a screen response on the GUI including a place, date, temperature, and a cloudy icon are output as dialog responses. In addition, by applying GUI+TEXT 4, an utterance response that says "Here" together with a screen response on the GUI including a place, date, temperature, and a cloudy icon are output as dialog responses.

Note that a plurality of dialog responses can be generated even with one capability, and a final dialog response is only required to be determined by the developer 1 (for example, an application developer). In addition, as will be described in detail later, the dialog response design tool 101 also provides means that changes an automatically generated dialog response.

Example of Conversion Template for Each Dialog Act Type

Here, details of the conversion template 160 for each dialog act type (TYPE) will be described. The dialog act type (TYPE) is a general-purpose act type that does not depend on an application (domain).

Examples of the dialog act type (TYPE) include INFORM, ACK, ASK, EXPLICIT_CONFIRM, and IMPLICIT_CONFIRM. Hereinafter, the details of the conversion template 160 for each dialog act type (TYPE) will be indicated in (c1) to (c5).

(c1) INFORM
TYPE: INFORM
Meaning: An act of transmitting some information from a dialog system to a user is indicated.
Examples of the conversion template 160:
"$1 is here"
"$1 is $2"
"$1 is [$2, $3, . . . , $N]"
Examples of dialog responses:
"Tomorrow's weather will be sunny"
"You have three plans today. The first is XXX, and the second is YYY"
(c2) ACK
TYPE: ACK
Meaning: A response to some instruction from a user is meant. The response may be detailed as ACK-YES/ACK-NO.
Examples of the conversion template 160:
"Sure"
"I understand"
"$1, certainly"
"I don't know"
Examples of dialog responses:
U: "Stop the alarm"
S: "Sure"
U: "Turn off the TV"

S: "OK"
U: "Turn off the TV"
S: "The TV is not responding" (corresponding to ACK-NO)
(c3) ASK
TYPE: ASK
Meaning: An act of a dialog system making an inquiry to a user to achieve a purpose of the user (for example, "confirming the weather", or "searching for a restaurant") is indicated.
Examples of the conversion template 160:
"Please tell me $1"
"Would you like to confirm $1?"
"What is $1?"
Examples of dialog responses:
"For which place do you want to confirm the weather?"
"For which day do you want to confirm your schedule?"
"What is your favorite dish?"
(c4) EXPLICIT_CONFIRM
TYPE: EXPLICIT_CONFIRM
Meaning: An act of explicitly confirming information is indicated. Generally, the act is performed also for obtaining confirmation by a user in a case where, for example, reliability of a recognition engine is low when voice recognition or the like is used. Generally, the act is often used in combination with acts of other TYPEs such as INFORM.
Examples of the conversion template 160:
"It is $1. Is it correct?"
"It is $1, right?"
Examples of dialog responses
"Chinese food, right?", "Three found nearby"
(c5) IMPLICIT_CONFIRM
TYPE: IMPLICIT_CONFIRM
Meaning: To implicitly confirm information to a user, unlike EXPLICIT_CONFIRM described above. Since the confirmation is made implicitly, a user is not asked to respond to the confirmation. However, since a dialog system utters the information, there is an advantage that, for example, in a case where there is an error in recognition, the user can notice and point out the error.
Examples of the conversion template 160:
"$1 is here" (content may be the same as that of INFORM)
"It is $1. Here" (content may be the same as that of INFORM)
"It is $1. What is $2?" (content may be combined with that of ASK)

Response Modality Conversion

Figure 5:
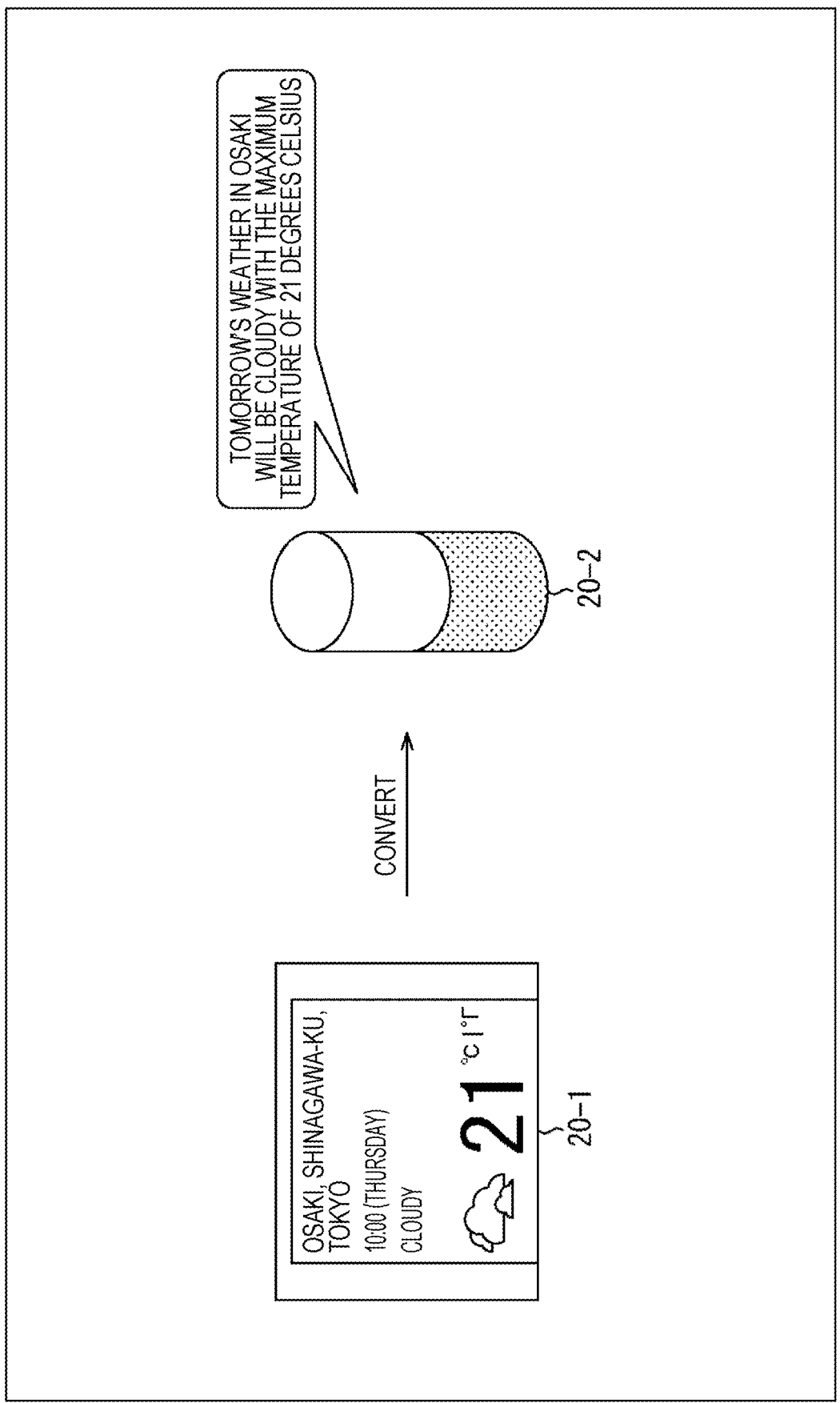
FIG. 5 is a diagram illustrating a first example of conversion between agent devices having different capabilities.
Figure 6:
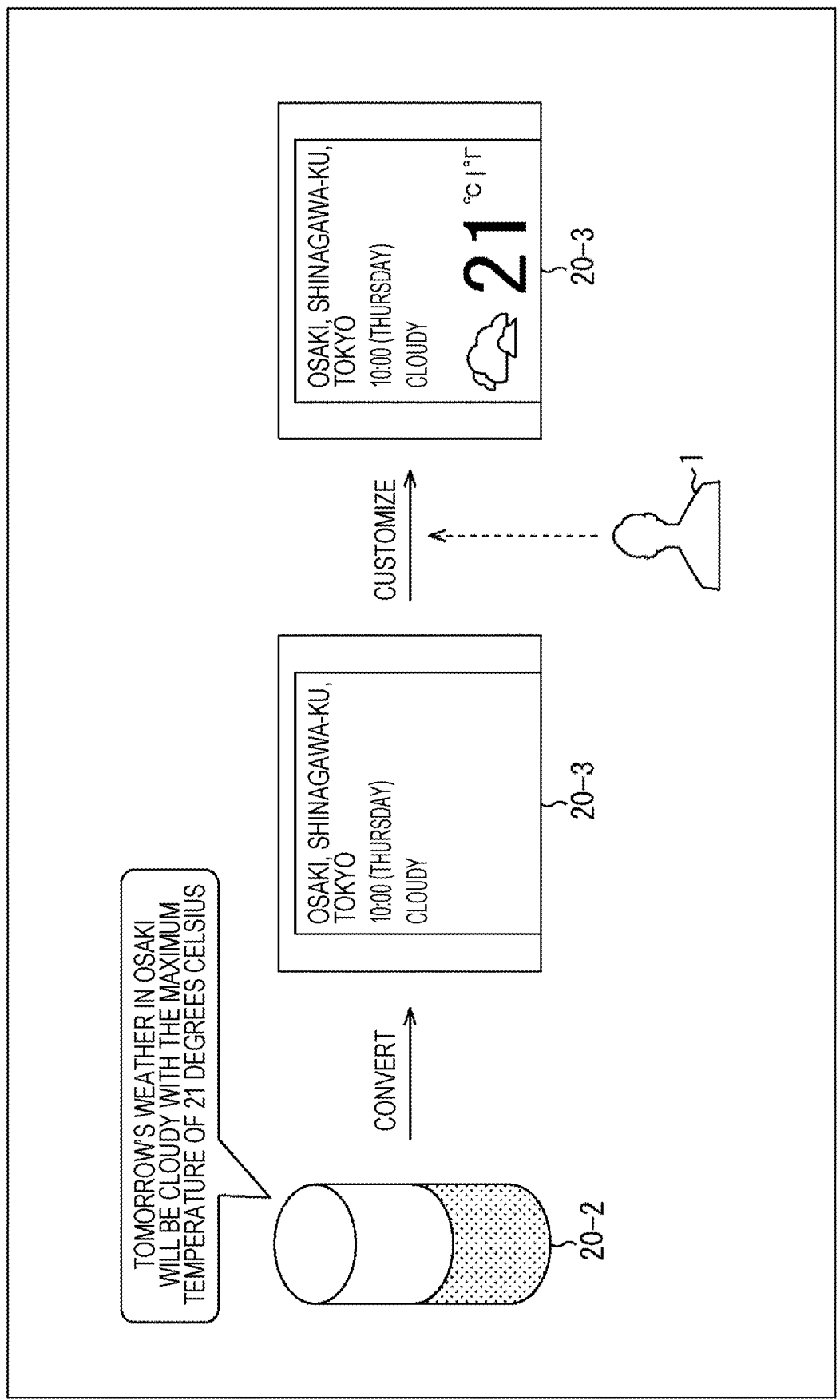
FIG. 6 is a diagram illustrating a second example of conversion between agent devices having different capabilities.

In the above description, the flow of automatic deployment from the general-purpose dialog response frame 150 has been described as the generation of a dialog response. Here, a flow of conversion of a specific dialog response already generated into another capability will be described.
The conversion is useful means in the sense that existing dialog response resources can be reused when, for example, an agent device 20 having a speaker was deployed at the initial stage but a service will be expanded thereafter to further deploy an agent device 20 having a display.
FIGS. 5 and 6 illustrate examples of conversion between the agent devices 20 having different capabilities.
FIG. 5 illustrates an example of conversion for reusing a dialog response deployed to the agent device 20-1 (smartphone) having "display" as the capability (interface information) in another agent device 20-2 (smart speaker) having "speaker" as the capability (interface information).

Specifically, in the agent device 20-1 (smartphone), for example, most of a dialog response is expressed as graphical information by a screen response (GUI) in a case where a user makes an utterance that says "Tell me about the tomorrow's weather in Osaki". At this time, a case where a similar dialog response is made by another agent device 20-2 (smart speaker) is assumed.
In this case, since the agent device 20-2 has only "speaker" as the interface information, the graphical information is unnecessary. Thus, here, the graphical information is converted into text (converted according to a conversion rule) to enable an utterance response (TTS).
With this configuration, in the case where a user makes an utterance that says "Tell me about the tomorrow's weather in Osaki", the agent device 20-2 (smart speaker) outputs, as a dialog response to the utterance, an utterance response that says "Tomorrow's weather in Osaki will be cloudy and the maximum temperature will be 21 degrees Celsius".
In addition, FIG. 6 illustrates an example of conversion for reusing a dialog response deployed to the agent device 20-2 (smart speaker) having "speaker" as the capability (interface information) in another agent device 20-3 (speaker with a display) having "display" as the capability (interface information).
Specifically, for example, in the case where a user makes an utterance that says "Tell me about the tomorrow's weather in Osaki", the agent device 20-2 (smart speaker) outputs, as a dialog response to the utterance, an utterance response that says "Tomorrow's weather in Osaki will be cloudy and the maximum temperature will be 21 degrees Celsius". At this time, a case where a similar function is performed by another agent device 20-3 (speaker with a display) is assumed.
In this case, since the agent device 20-3 has "display" as the interface information, the dialog response can be expressed as graphical information by a GUI. Thus, here, text of TTS is converted (automatically converted) into a component of the GUI so that the graphical information can be displayed.
In addition, here, the developer 1 can make final adjustment (customization) to the converted information (graphical information). In the example of FIG. 6, as a result of the final adjustment by the developer 1, image information such as a cloudy icon and temperature is added as the graphical information to text information such as a place, date, and weather. Here, since a dialog response serving as a base has already been generated automatically, a workload of the developer 1 can be reduced compared to designing a dialog response from scratch.
With this configuration, in the case where a user makes an utterance that says "Tell me about the tomorrow's weather in Osaki", the agent device 20-3 (speaker with a display) outputs, as a dialog response to the utterance, a screen response including the graphical information such as a place, date, weather, a cloudy icon, and temperature.
Note that, since the agent device 20-3 (speaker with a display) has "speaker" as the interface information, for example, adjustment may be made so that a part of the dialog response is output by an utterance response. In addition, also in the example of FIG. 5, the developer 1 may make final adjustment as in the example of FIG. 6. In addition, details of conversion methods illustrated in FIGS. 5 and 6 will be described later.

Rule-Based Conversion Algorithm

As a conversion method between the agent devices 20 having different capabilities, a rule-based conversion algorithm that describes the conversion method as a rule can be used. In this conversion method, although it is necessary to design the rule-based conversion algorithm in advance, a dialog response which can be easily adjusted and is flexible can be designed.

Note that it is not necessary to design everything manually here. For example, in a case where there is regularity or the like when focusing on a data structure, the design can be automated to some extent. In addition, in these conversions, work such as addition or editing can be easily made by anybody, for example, by the developer 1. Hereinafter, specific examples are indicated in (d1) and (d2).

(d1) Mutual Conversion Between TTS and GUI

In mutual conversion between an utterance response (TTS) and a screen response (GUI), list representation is analyzed and deployed. At this time, the maximum number of list items and the like are variable and can be set as parameters.

Example of TTS

"This week's weather will be sunny in Tokyo, rainy in Kyoto, and rainy also in Fukuoka"

Here, a list structure of the text is detected. At the time of the detection of the list structure, learning may be performed by a dedicated detector, or annotation of the list structure may be performed manually. Note that application to an application that handles a list structure, such as a schedule and a to-do list, is also possible.

Example of GUI:

```
<p>This week's weather</p>
<ul>
    <li>Tokyo: Sunny</li>
    <li>Kyoto: Rainy</li>
    <li>Fukuoka: Rainy</li>
</ul>
```

Here, parallel information is analyzed (for example, subjected to a morphological analysis) and displayed in a list. In addition, at the time of conversion from a screen response (GUI) to an utterance response (TTS), in an HTML document, detection is easy and deployment to another capability is easy since a list structure is explicit (ul-li).

Example of GUI+TTS:

```
//TTS
"This week's weather is here"
//GUI
<ul>
    <li>Tokyo: Sunny</li>
    <li>Kyoto:mRainy</li>
    <li>Fukuoka: Rainy</li>
</ul>
```

In a case where both an utterance response (TTS) and a screen response (GUI) are used, parallel information is analyzed to generate text of the TTS that is conscious of displaying in a list. Here, for example, the text of the TTS can be omitted by being conscious of displaying in a list.

(d2) Mutual Conversion Among Concise Utterance Response, Sound Effect (SE) Response, and GUI For example, in a case where the dialog act type (TYPE) is ACK (ACK-YES/ACK-NO), reuse in various situations is possible as indicated below.

Example of TTS:
  U: "Turn off the light"
  S: "The light is turned off"
  U: "Turn off the light"
  S: "The light is not turned off"
Example of SE:
  U: "Turn off the light"
  S: "ping" (sound effect of success)
  U: "Turn off the light"
  S: "beep" (sound effect of failure)
Example of GUI:
  U: "Turn off the light"
  S: <img src="OK-mark.png"> (image display of success)
  U: "Turn off the light"
  S: <img src="FAIL-mark.png"> (image display of failure)

Custom Support for Dialog Response After Conversion

In a case where a markup language such as an HTML is used, a data structure and layout design can be separated, which is compatible with customization of a dialog response. In particular, in the case of the HTML, it is possible to easily customize a generated dialog response by using a style sheet such as cascading style sheets (CSS).

Figure 7:
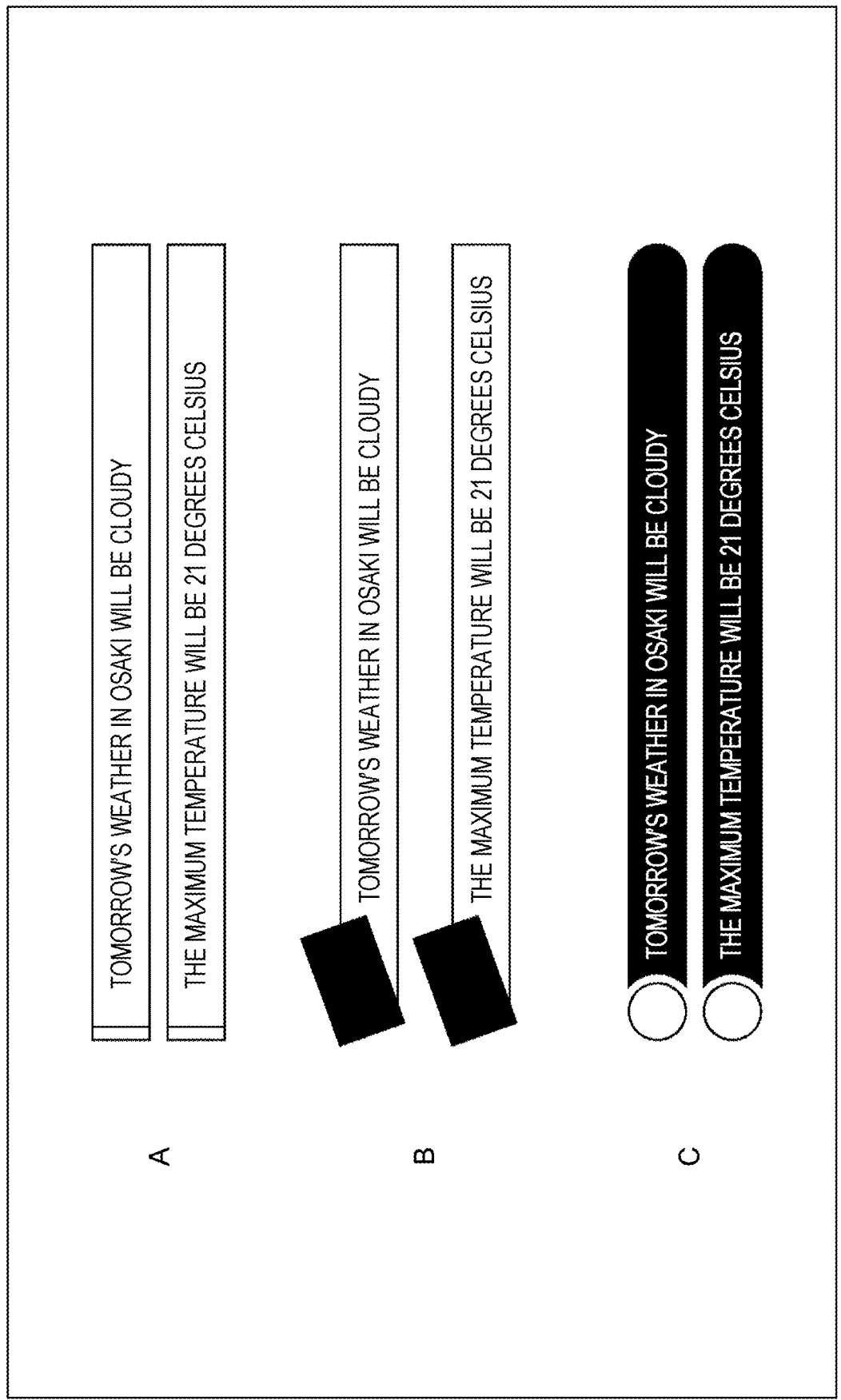
FIG. 7 is a diagram illustrating examples of reflection of custom layouts of a dialog response after conversion.

As the style sheet used here, a style sheet prepared as a standard may be selected, or a developer may correct a layout. FIG. 7 illustrates examples of reflection of custom layouts of a dialog response after conversion.

For example, in an HTML document, by using a structure such as <ul class="custom-list"< . . . . </ul>, a layout can be changed simply by editing the CSS of the custom-list class. In this case, a data structure can be used as it is. Thus, as illustrated in A to C of FIG. 7, by using different CSS, a display layout of a screen response that says "Tomorrow's weather in Osaki will be cloudy and the maximum temperature will be 21 degrees Celsius" can be changed.

Parameter Adjustment

Parameters such as language, dialect, and politeness may be adjusted. By adjusting dialect, politeness, and the like, text (characters) displayed in a screen response (GUI), intonation of the text read aloud in an utterance response (TTS), and the like can be changed.

Machine Learning-Based Conversion Algorithm

Here, for example, it is possible to generate a dialog response without relying on rules or heuristics by using deep learning, which is one of machine learning methods.

Figure 8:
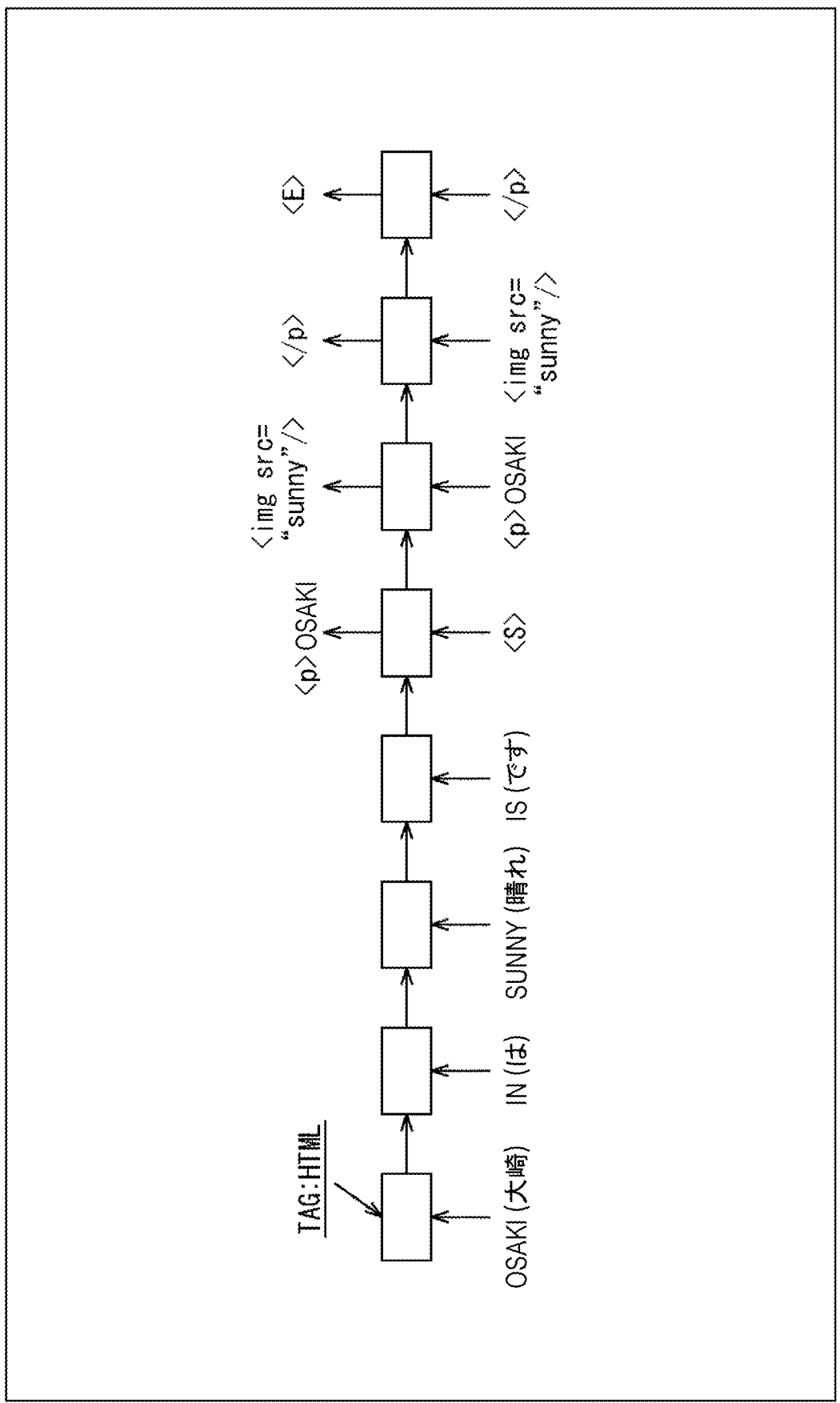
FIG. 8 is a diagram illustrating an example of generation of a dialog response of an optional capability by a Sequence-to-Sequence model.

FIG. 8 illustrates an example of generation of a dialog response of an optional capability by a Sequence-to-Sequence model.

In the Sequence-to-Sequence model illustrated in FIG. 8, a currently existing dialog response or the general-purpose dialog response frame 150 is input as a sequence, and a desired dialog response is output as a sequence. Specifically, text that says "Osaki is sunny" is used as input, and a dialog response including text that says "Osaki" and a sun icon (image) is output.

Here, by inputting "HTML" as a tag ("TAG" in the figure), a dialog response in an HTML format is output. Note that, in addition to inputting a tag, for example, a model may be learned for each capability pair.

Dynamic Dialog Response Generation by Using Context

Even for one user utterance, it is necessary to flexibly customize a dialog response depending on context. Here, context information regarding context can include information regarding, for example, a time zone, a person, a distance, and a scene. Hereinafter, examples of dialog responses corresponding to the context information are indicated in (e1) to (e4).

(e1) Time Zone

At the time of making a dialog response in response to an utterance from a user, it is possible to generate the dialog response corresponding to the time zone. For example, in the case of a time zone of night, the agent device 20 can generate a dialog response in such a way that luminance of a display screen on the display is lowered to make a screen response, or a reproduction volume from the speaker is lowered to make an utterance response.

(e2) Person

It is possible to generate a dialog response corresponding to a person existing around. For example, the agent device 20 can generate a dialog response in such a way that a screen response or an utterance response for one person, for a couple, for a family, for a guest, or the like is made, corresponding to a person existing around.

(e3) Distance

It is possible to generate a dialog response corresponding to a distance to a user with whom a dialog is conducted. For example, in a case where the agent device 20 is far from the user, the agent device 20 can generate a dialog response in such a way that an image size and a text font size are increased to make a screen response, or a reproduction volume from the speaker is increased to make an utterance response.

(e4) Scene

It is possible to generate a dialog response corresponding to a scene. For example, in a case where a user is on a train, the agent device 20 can generate a dialog response in such a way that an utterance response from the speaker is replaced with a response by another capability (for example, e-mail or vibration).

In addition, for example, in a case where there is a guest in a room, the agent device 20 can generate a dialog response in such a way that, as for private information of a user (for example, personal schedule), a mobile terminal (for example, a smartphone owned by the user) is notified of a corresponding message instead of a screen response or an utterance response.

Note that, although the case where a time zone, a person, a distance, and a scene are used as the context information has been described here, these are examples. For example, another context corresponding to information such as sensing information detected by a sensor unit of the agent device 20 may be used.

Correspondence to Accessibility

It is also possible to consider accessibility using the present technology. For example, for an agent device 20 having a display, a speaker, and haptics (for example, a vibration element) as capabilities (interface information), it is made possible to generate dialog responses by all combinations of the capabilities (interface information).

With this configuration, in the agent device 20, a capability corresponding to accessibility is selected, and it is possible to flexibly provide the accessibility for various users.

For example, for a totally blind user, a screen response (GUI) function can be turned off and switching is performed to a capability with an utterance response (TTS) function only, on the basis of preset settings, sensing information, and the like. In addition, for example, for a user who has difficulty in hearing, the utterance response (TTS) function can be turned off and switched to the screen response (GUI) function.

Output Corresponding to Capability Information

Even in one agent device 20, expression performance (for example, performance of a central processing unit (CPU), screen resolution, and the number of sound channels) may differ, and the difference in the expression performance is represented by capabilities (capability information). In addition, the agent device 20 can output dialog responses corresponding to the capability information.

Figure 9:
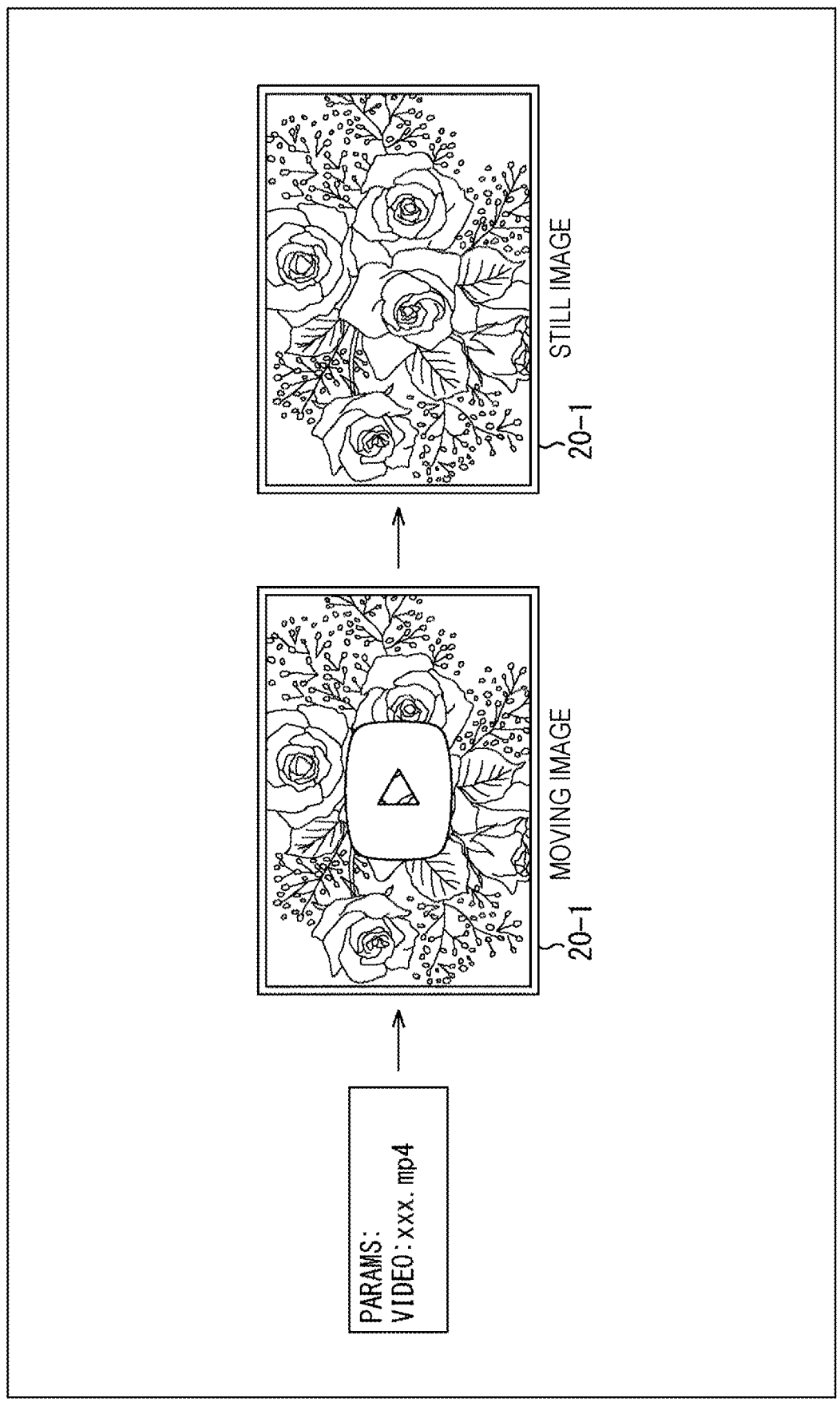
FIG. 9 is a diagram illustrating an example of switching of a dialog response according to expression performance of an agent device.

FIG. 9 illustrates an example of switching of a dialog response according to expression performance of the agent device 20.

For example, in a case where a moving image file named xxx.mp4 is reproduced as a screen response, the moving image file is reproduced as it is when the agent device 20-1 (smartphone) is a machine of high specification, such as when performance of the CPU as expression performance is high.

On the other hand, for example, a still image is displayed as a screen response by using a thumbnail of the moving image file or generating a still image file in a predetermined format (for example, graphics interchange format (GIF format)) from the moving image file when the agent device 20-1 (smartphone) is a machine of low specification, such as when performance of the CPU as expression performance is low.

In this way, the dialog response design device 10 can generate and deploy a dialog response (screen response, utterance response, or the like) corresponding to a capability (capability information) of the agent device 20 as a deployment destination. Note that the conversion of a dialog response according to the expression performance may be automatically processed by the dialog response design device 10 or may be explicitly instructed by the developer 1.

Use of Additional Response

By using a dialog model learned from human data in advance, or a dialog model using manual dialog design, additional response (automatic additional response) including additional information can be used for a new dialog response or an existing dialog response. The developer 1 can use the additional response without doing anything. In addition, the developer 1 can finely adjust the additional response by using parameters as needed. Hereinafter, examples of the additional response are indicated in (f1) to (f4).

(f1) New Response Type

In a new response type, for example, in question answering (QA) or the like about a simple fact, a response can be made even if the developer has not set a dialog response. In other words, it can also be said that a built-in QA function is provided.

First Specific Example

U: "Who is the President of the United States?"
S: "XXXXXXXX"

Second Specific Example

U: "Turn on the TV"
S: "ping" (sound effect)
(f2) New Addition Type
In a new addition type, for example, words such as a back-channel and a simple greeting are added. A frequency and timing of addition of words are set by the developer. The timing is assumed to be, for example, when a user is talking for a long time or when a service is taking time to load.

First Specific Example

U: "I have a lot of fun today"
S: "Uh-huh"

Second Specific Example

S: "The Himalayas are 8848 meters high"
U: "You're smart!"
S: "Thank you!"
(f3) Additional Addition Type
In an additional addition type, for example, a filler is added or a simple greeting is added in a case where it takes time to reproduce a natural utterance or to execute a background service.

First Specific Example

U: "Show me the event being held in Shibuya"
S: "Well, here it is"

Second Specific Example

U: "Good morning. Show me today's schedule"
S: "Good morning. Today's schedule is . . . "
(f4) Function Supplementation Type
In a function supplementation type, for example, explicit or implicit confirmation information is added to a dialog response in a case where reliability of voice recognition or a semantic analysis is low.

First Specific Example

U: "Show me the weather, ※○△ tomorrow" (case where noise is included and accuracy in voice recognition is low)
  S (original): "Weather is here"+GUI
  S (another first example): "Tomorrow's weather is here"+GUI
  S (another second example): "Tomorrow, right? Tomorrow's weather is here"+GUI
The functions of the dialog response design device 10 have been mainly described above. In the dialog response design device 10, a capability (including interface information and capability information) for each agent device 20 that outputs a dialog response is acquired, a dialog response corresponding to the acquired capability is generated from the general-purpose dialog response frame 150 used as a seed at the time of generation of a dialog response, and the generated dialog response is deployed for each agent device 20.

That is, the general-purpose dialog response frame 150 is a frame (file) described in conformity to a specification of a general-purpose dialog response, and the dialog response design device 10 is configured as a generator that outputs a dialog response suitable for an optional agent device 20 by using, as input, the general-purpose dialog response frame 150, the conversion template 160, and the capability list 103.

With this configuration, the developer 1 can design (automatically design) dialog responses without being conscious of capabilities (expression means) of the agent devices 20 simply by describing the general-purpose dialog response frame 150. Thus, the agent devices 20 having various capabilities can be supported only by maintaining a specification of one general-purpose dialog response. In addition, for example, even when a device corresponding to a dialog agent changes (increases or decreases), it is possible to flexibly respond to the changes (increases or decreases). As a result, a dialog response can be provided more appropriately.

In addition, the dialog response design device 10 can convert a dialog response designed for a specific agent device 20 into a dialog response for another agent device 20 having a different capability (the above-described "response modality conversion"). Furthermore, in addition to using the built-in dialog response template, the developer 1 can perform customization so that detailed rules for deploying a dialog response can be designed at the time of deployment of the dialog response to the agent device 20.

Note that, in the technology disclosed in Patent Document 1 described above, a pre-designed dialog DB and dialog generation means that calculates a correlation between words are used for an input sentence, to determine dialogs to be output from the designed dialog DB and the dialog generation means, and it is intended to reduce labor of a developer by using the dialog generation means under certain conditions even if the developer does not design all dialog responses.

On the other hand, the technology according to the present disclosure takes different approach because it is intended to reduce labor of a developer by the dialog response design device 10 deploying dialog responses to the agent devices 20 having various types of expression means (capabilities). In addition, subjects of the technology according to the present disclosure are the agent devices 20 having various types of expression means (capabilities). On the other hand, subjects of the technology disclosed in Patent Document 1 are text display and utterance through voice synthesis, and the subjects are restrictive.

In addition, the technology disclosed in Patent Document 1 does not have a concept such as template deployment suitable for a device, and rewrites a part or all of a dialog response by the dialog generation means. Also in this respect, the technology disclosed in Patent Document 1 is significantly different from the technology according to the present disclosure. Furthermore, a method called responsive web design is known, but this design method is limited to display representation, and is different from the technology according to the present disclosure, subjects of which are the agent devices 20 having various types of expression means (capabilities).

Configuration of Agent Device

Incidentally, at the time of execution of a dialog response deployed by the dialog response design device 10, the agent device 20 may output not only the deployed dialog response as it is, but also a more appropriate dialog response to a user.

Figure 10:
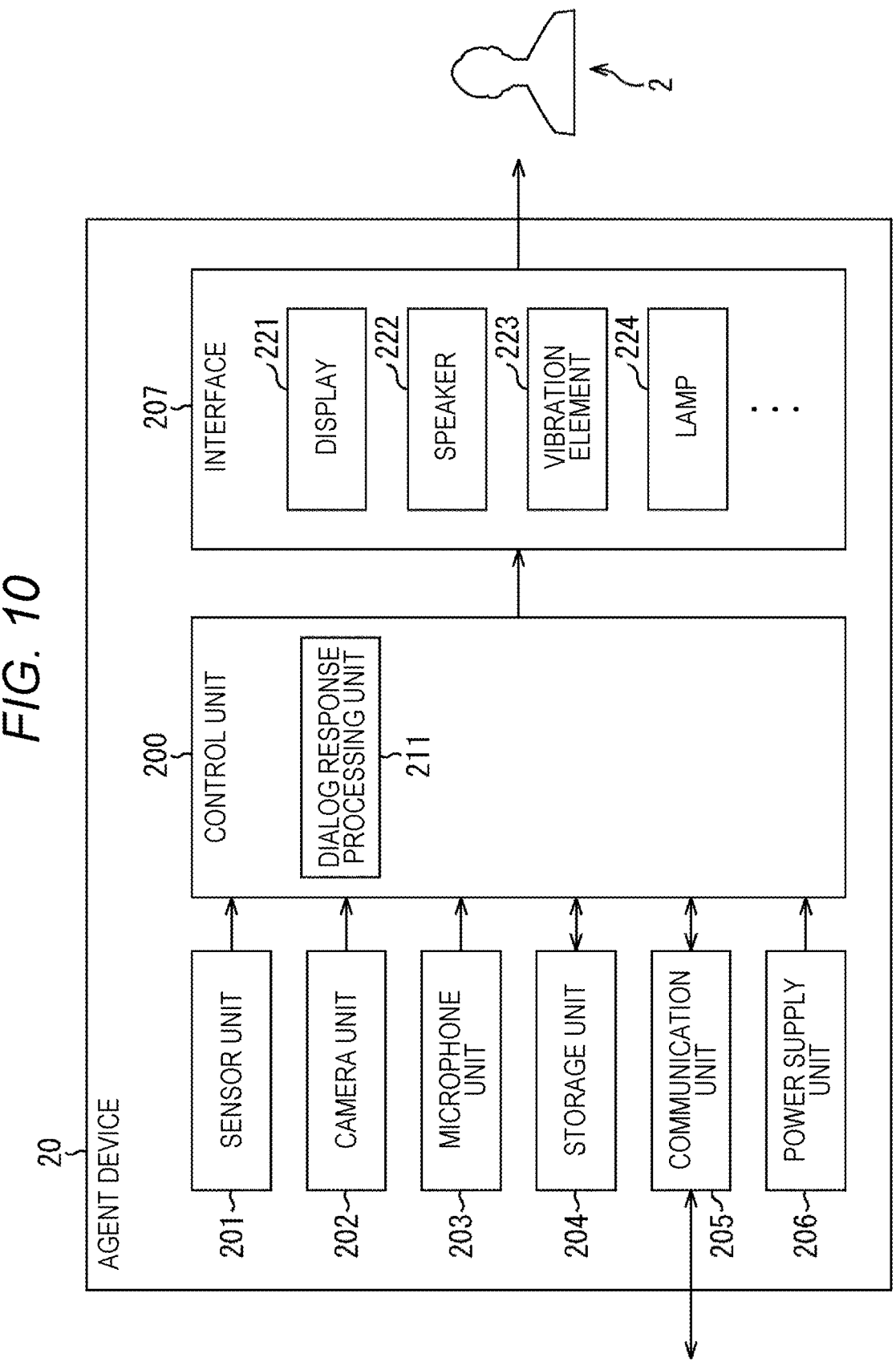
FIG. 10 is a diagram illustrating a configuration example of an embodiment of the agent device as an information processing apparatus to which the present technology is applied.

FIG. 10 is a diagram illustrating a configuration example of an embodiment of the agent device as an information processing apparatus to which the present technology is applied.

The agent device 20 includes a control unit 200, a sensor unit 201, a camera unit 202, a microphone unit 203, a storage unit 204, a communication unit 205, a power supply unit 206, and an interface 207.

The control unit 200 includes, for example, a processor such as a CPU or a field programmable gate array (FPGA). The control unit 200 is a central processing device that controls operation of each unit and performs various types of arithmetic processing. The control unit 200 includes a dialog response processing unit 211. The dialog response processing unit 211 performs processing related to a dialog response.

The sensor unit 201 includes, for example, various sensor devices. The sensor unit 201 senses a user, surroundings of the user, and the like, and supplies resulting sensing information to the control unit 200.

Here, the sensor unit 201 includes, for example, a magnetic sensor that detects magnitude or a direction of a magnetic field, an acceleration sensor that detects acceleration, a gyro sensor that detects an angle (attitude), angular velocity, and angular acceleration, or a proximity sensor that detects an adjacent object.

The sensor unit 201 also includes a sensor for measuring a surrounding environment, such as a temperature sensor that detects temperature, a humidity sensor that detects humidity, or an ambient light sensor that detects brightness of surroundings, or a biosensor that detects biological information such as a breath, a pulse, a fingerprint, and an iris.

The camera unit 202 includes, for example, an image sensor such as a complementary metal oxide semiconductor (CMOS) image sensor or a charge coupled device (CCD) image sensor, and a signal processing unit such as a camera image signal processor (ISP). In the camera unit 202, image information obtained by performing various types of signal processing by the signal processing unit on an imaging signal obtained by capturing an image of an object by the image sensor is generated and supplied to the control unit 200.

The microphone unit 203 converts sound (voice) from the outside into an electric signal, and supplies resulting voice information to the control unit 200.

The storage unit 204 includes, for example, a storage device such as a semiconductor memory or a hard disk drive (HDD). The storage unit 204 stores various data under the control of the control unit 200. Note that the storage unit 204 can store dialog responses deployed by the dialog response design device 10 (hereinafter, also referred to as deployed specific dialog responses) as a database (deployed specific dialog response DB 250 of FIG. 12 or 13 described later).

The communication unit 205 includes a communication module compatible with wireless communication or wired communication conforming to a predetermined standard. As this communication module, for example, one that corresponds to communication systems such as wireless local area network (LAN) and cellular communication (for example, LTE-Advanced or 5G) is used. The communication unit 205 exchanges various types of information with another device (for example, the dialog response design device 10) under the control of the control unit 200.

The power supply unit 206 supplies, under the control of the control unit 200, power supply power obtained from an external power supply or a storage battery to each unit of the agent device 20 including the control unit 200.

The interface 207 is a user interface for exchanging information with a user 2. In other words, the interface 207 can be said to be expression means of various dialog responses, which is possessed by the agent device 20.

For example, the interface 207 includes expression means such as a display 221, a speaker 222, a vibration element 223, and a lamp 224. The expression means is the same or different for each agent device 20, and each agent device 20 may be provided with not only one type of expression means but also a plurality of types of expression means. In addition, in the agent device 20, interface information and capability information corresponding to the interface 207 (expression means such as the display 221) are used as capabilities.

Note that the configuration illustrated in FIG. 10 is an example, and it is not necessary to include all the components. For example, a configuration excluding some components such as the camera unit 202 and the microphone unit 203 may be adopted. Alternatively, for example, other components such as a position information detection unit for detecting position information including a global positioning system (GPS) signal may be added to the configuration illustrated in FIG. 10.

Flow of Dialog Response Execution Processing

Next, a flow of dialog response execution processing executed by the agent device 20 will be described with reference to a flowchart of FIG. 11.

Figure 11:
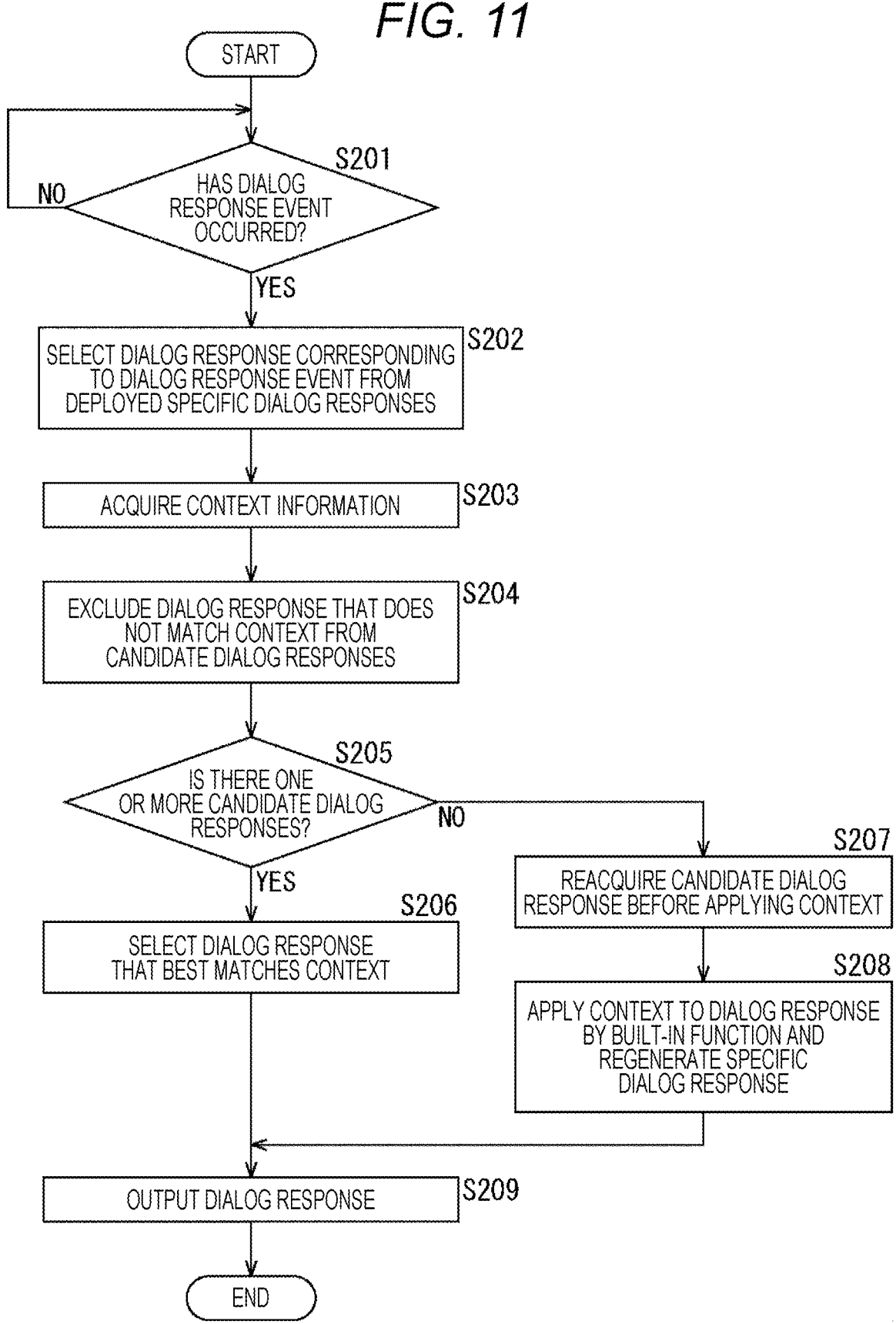
FIG. 11 is a flowchart illustrating a flow of dialog response execution processing.

Note that, at the time of execution of the processing illustrated in FIG. 11, deployed specific dialog responses deployed by the dialog response design device 10 are stored in the storage unit 204 (the deployed specific dialog response DB 250 of FIG. 12 and the like described later) of the agent device 20.

In Step S201, the dialog response processing unit 211 determines whether a dialog response event has occurred. The dialog response event is an event that causes (triggers) a dialog response system to actually execute and express a dialog response.

Although the dialog response event is generally an utterance from the user 2, the dialog response event also includes user information actively detected by the dialog response system and an event hook from another service. The former user information includes, for example, information such as "I will play music when I get home". In addition, the latter event hook includes, for example, when scheduled date or time registered by the user in a schedule management application comes.

In a case where it is determined in the determination processing of Step S201 that the dialog response event has occurred, the processing proceeds to Step S202.

In Step S202, the dialog response processing unit 211 selects a dialog response corresponding to the occurred dialog response event from the deployed specific dialog responses. The dialog response selected here is not limited to one, and a plurality of dialog responses may be selected. That is, for example, a case is assumed where there is a plurality of corresponding dialog responses due to difference in capabilities of the agent devices 20. Hereinafter, the dialog response selected here will be particularly referred to as a candidate dialog response.

In Step S203, the dialog response processing unit 211 acquires context information. Examples of the context information include various types of information regarding context, such as a current situation of the user, a state of the agent device 20, a surrounding environmental state, and a dialog history. For example, the context information can be acquired on the basis of information of user settings, sensing information, and external services.

In Step S204, the dialog response processing unit 211 excludes, on the basis of the acquired context information, a dialog response that does not match the context from the candidate dialog responses.

Here, for example, in a case where the user is totally blind, the display is disabled according to the capability (interface information), and a corresponding dialog response is excluded from the candidate dialog responses. In addition, for example, in a case where a time zone is late at night, the speaker is disabled, and a corresponding dialog response is excluded. Alternatively, for example, in a case where a large display device is installed around the agent device 20, the display device is used, and a dialog response related to another display device is excluded.

In Step S205, the dialog response processing unit 211 determines whether there is one or more candidate dialog responses. In a case where it is determined in Step S205 that there is one or more candidate dialog responses, the processing proceeds to Step S206.

In Step S206, the dialog response processing unit 211 selects, on the basis of the acquired context information, a dialog response that best matches the context from the candidate dialog responses.

Here, for example, a dialog response most suitable for conditions of the context can be selected from the candidate dialog responses. Alternatively, the developer 1 may freely set a selection policy, for example, a dialog response that makes maximum use of the capability may be selected, or a dialog response that consumes the least amount of power may be selected.

On the other hand, in a case where it is determined in Step S205 that there is no candidate dialog response, the processing proceeds to Step S207.

In Step S207, the dialog response processing unit 211 reacquires (acquires again) a candidate dialog response before applying the context in the processing of Step S204.

That is, here, since there was no predefined dialog response that matches the context, the context is once ignored and a corresponding dialog response is regained. In other words, it can also be said that a context filter is removed here.

In Step S208, the dialog response processing unit 211 applies context to the dialog response by a built-in function (by using context prepared in advance for performing general-purpose processing), and regenerates (generates again) a specific dialog response.

Here, for example, adjustment (automatic adjustment) is performed so as to provide a dialog response corresponding to the context. That is, as in the case indicated in "Dynamic Dialog Response Generation by Using Context" described above, a specific dialog response is dynamically generated according to a time zone, a person, a distance, and a scene, for example.

Note that design of a dialog response by using context may be performed by the developer 1 (application developer) in advance. Alternatively, in a case where there is no corresponding dialog response that matches context, a method in which support is (automatically) provided by the dialog system may be adopted.

In addition, in a case where the built-in function is not provided, or in a case where a dialog response that completely matches the context cannot be generated even if the built-in function is used, for example, the following processing can be performed. That is, for example, the dialog response processing unit 211 may generate a response (notification) notifying that a dialog response cannot be performed, in addition to selecting a dialog response that most satisfies the context. As the response, for example, a message that says "The function cannot be executed at this time" can be output, or an LED can be blinked in red.

When the processing of Step S206 or S208 is completed, the processing proceeds to Step S209. In Step S209, the dialog response processing unit 211 outputs the dialog response via the interface 207. As a result, the user 2 can recognize the dialog response output from the agent device 20.

The flow of the dialog response execution processing has been described above.

Figure 12:
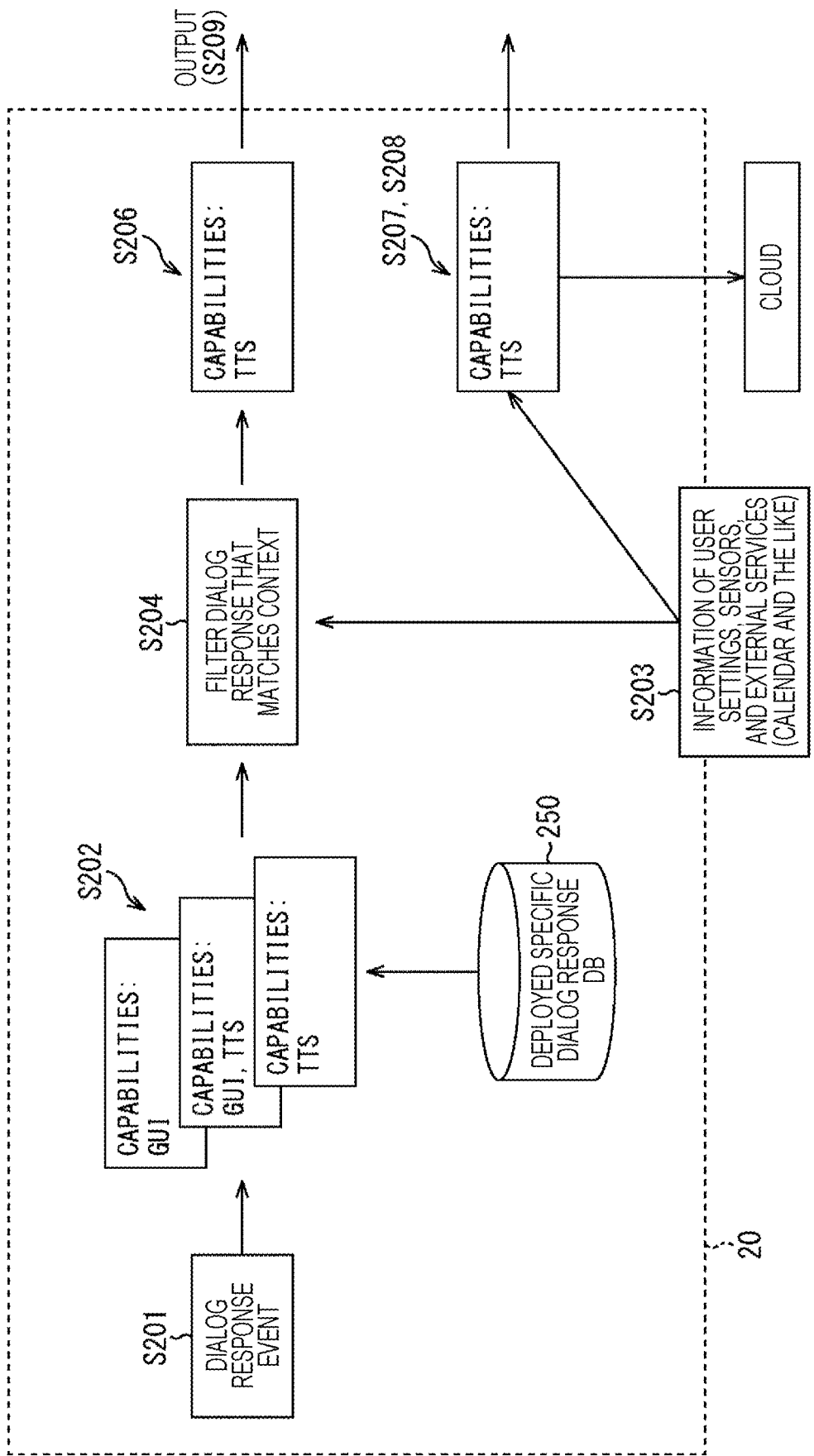
FIG. 12 is a diagram illustrating an example of generation of a general dialog response.
Figure 13:
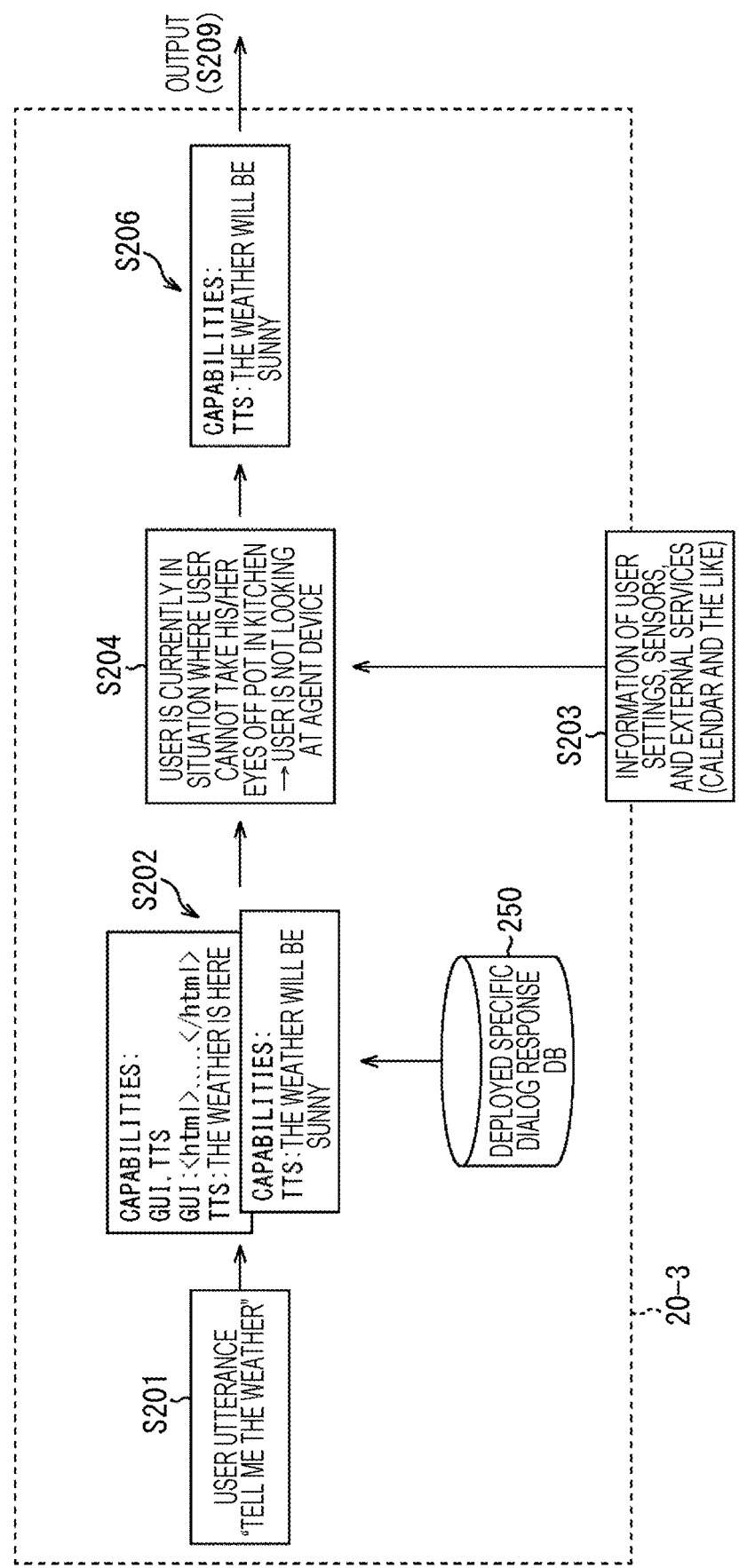
FIG. 13 is a diagram illustrating an example of generation of a specific dialog response.

Here, FIGS. 12 and 13 schematically illustrate each processing of the dialog response execution processing illustrated in FIG. 11. FIG. 12 illustrates an example of generation of a general dialog response.

In FIG. 12, in a case where a dialog response event occurs ("YES" in S201 in FIG. 11), the agent device 20 acquires a deployed specific dialog response corresponding to the dialog response event from the deployed specific dialog response DB 250 (S202 in FIG. 11).

At this time, the agent device 20 acquires context information on the basis of information of user settings, sensing information, and external services (S203 in FIG. 11), and filters a dialog response that matches the context on the basis of the context information (S204 in FIG. 11).

Then, in a case where there is one or more candidate dialog responses, the agent device 20 outputs a dialog response selected from the candidate dialog responses (S206 and S209 in FIG. 11). On the other hand, in a case where there is no candidate dialog response, the context is applied to the dialog response to regenerate and output a specific dialog response (S207 to S209 in FIG. 11).

Note that, here, not only the processing is executed in the agent device 20, but also processing such as dynamic generation of a dialog response that matches the context may be performed via the cloud, for example.

In addition, FIG. 13 illustrates an example of generation of a dialog response in a case where an utterance from the user 2 that says "Tell me the weather" is received as a dialog response event.

In FIG. 13, in a case where a user utterance that says "Tell me the weather" occurs as a dialog response event ("YES" in S201 in FIG. 11), the agent device 20-3 (speaker with a display) acquires two dialog responses as deployed specific dialog responses corresponding to the dialog response event from the deployed specific dialog response DB 250 (S202 in FIG. 11).

The first dialog response is made by a screen response (GUI) and an utterance response (TTS) corresponding to "display" and "speaker" as the capabilities. On the other hand, the second dialog response is made by an utterance response (TTS) corresponding to "speaker" as the capability.

At this time, the agent device 20-3 acquires context information on the basis of information such as sensing information, and recognizes that the user 2 is currently in a situation where the user 2 cannot take his/her eyes off in the kitchen, that is, the user 2 is not looking at the agent device 20-3 (S203 in FIG. 11). Thus, of the two dialog responses, the first dialog response including the screen response (GUI) is excluded as not matching the context (S204 in FIG. 11).

As a result, the agent device 20 selects the second dialog response (utterance response (TTS)) as a dialog response that best matches the context (S206 in FIG. 11), and outputs the utterance response that says "The weather will be sunny" as the dialog response (S209 in FIG. 11).

As described above, in a case where a dialog response event occurs, the agent device 20 acquires, from the general-purpose dialog response frame 150 used as a seed at the time of generation of a dialog response, dialog responses generated corresponding to capabilities (including interface information and capability information), acquires context information regarding context, selects, from the acquired dialog responses, a dialog response that matches the context, and outputs the selected dialog response.

Incidentally, the more capability options the agent device 20 has, the larger amount of information can be included in expression of the dialog response. In the present technology, it is possible to perform modality conversion that changes a device that should express a dialog response or a dialog response according to context information and capability information. Here, in particular, modality conversion when an expression capability (capability information) differs greatly for each agent device 20 (when there is a large difference in the expression ability (capability information)) at the time of the conversion will be described.

(g1) Conversion from One with High Expression Ability to One with Low Expression Ability In the case of conversion from one with a high expression ability (source (SRC)) to one with a low expression ability (destination (DST)), a method of reducing an amount of information or maintaining an amount of information in linkage with another device or the like is assumed.

Here, a case where the agent device 20-4 (television receiver) is the SRC and the agent device 20-6 (smartwatch) is the DST is assumed and described as an example.

Note that the television receiver includes, as capabilities, "display" and "speaker" as interface information and a screen size (screen resolution) of "large size (high resolution)" as capability information for "display". In addition, the smartwatch includes "display", "haptics", and "lamp" as interface information and a screen size (screen resolution) of "small size (ultra-low resolution)" as capability information for "display".

At this time, in a case where only a screen response (GUI) corresponding to a dialog response to the television receiver is performed in the smartwatch, for example, when information corresponding to the dialog response is displayed, the GUI can be displayed by lowering resolution or by dividing the display. As the division of the display, for example, divided information can be displayed by slide show, or the display can be switched by touch operation of the user 2.

In addition, in the smartwatch, a screen response (GUI) may be limited to display of an icon or a brief description related to the response, and information may be transmitted using another device.

Specifically, in the smartwatch, for example, when a weather forecast is displayed, while only an icon of an application that provides a weather forecast or only a character string "weather" can be displayed, in a case where the smartwatch is linked with a smartphone, detailed weather forecast information can be displayed using a display of the smartphone. Alternatively, for a speaker installed nearby, an earphone compatible with short-range wireless communication (for example, Bluetooth (registered trademark)), or the like, a screen response (GUI) is converted into an utterance response (TTS), so that detailed weather forecast information (information corresponding to the screen response) is output by the utterance response.

(g2) Conversion from One with Low Expression Ability to One with High Expression Ability In the case of conversion from one with a low display ability (SRC) to one with a high display ability (DST), a dialog response can be output as it is while maintaining an amount of information. Thus, information may be added to a spare ability, or an amount of information may be added to the original dialog response. Needless to say, the original dialog response may be maintained without adding any amount of information.

Here, a case where the agent device 20-6 (smartwatch) is the SRC and the agent device 20-4 (television receiver) is the DST is assumed and described as an example.

At this time, in a case where an amount of information is added to a dialog response to the smartwatch to perform a screen response (GUI) in the television receiver, and in a case where, for example, the user 2 asks "today's weather", information regarding today's weather can be displayed, and information regarding this week's weather, nearby weather, a rain cloud radar, or the like can be displayed in an extra space.

In addition, here, together with the information regarding today's weather, for example, information such as today's schedules of the user 2, or a response or an advertisement of a frequently activated application may be displayed in an extra space on the basis of information such as context information. Furthermore, in the television receiver, by voice using TTS, the user may be greeted or may be informed of today's fortune-telling or the like, for example.

2. Modification

Figure 14:
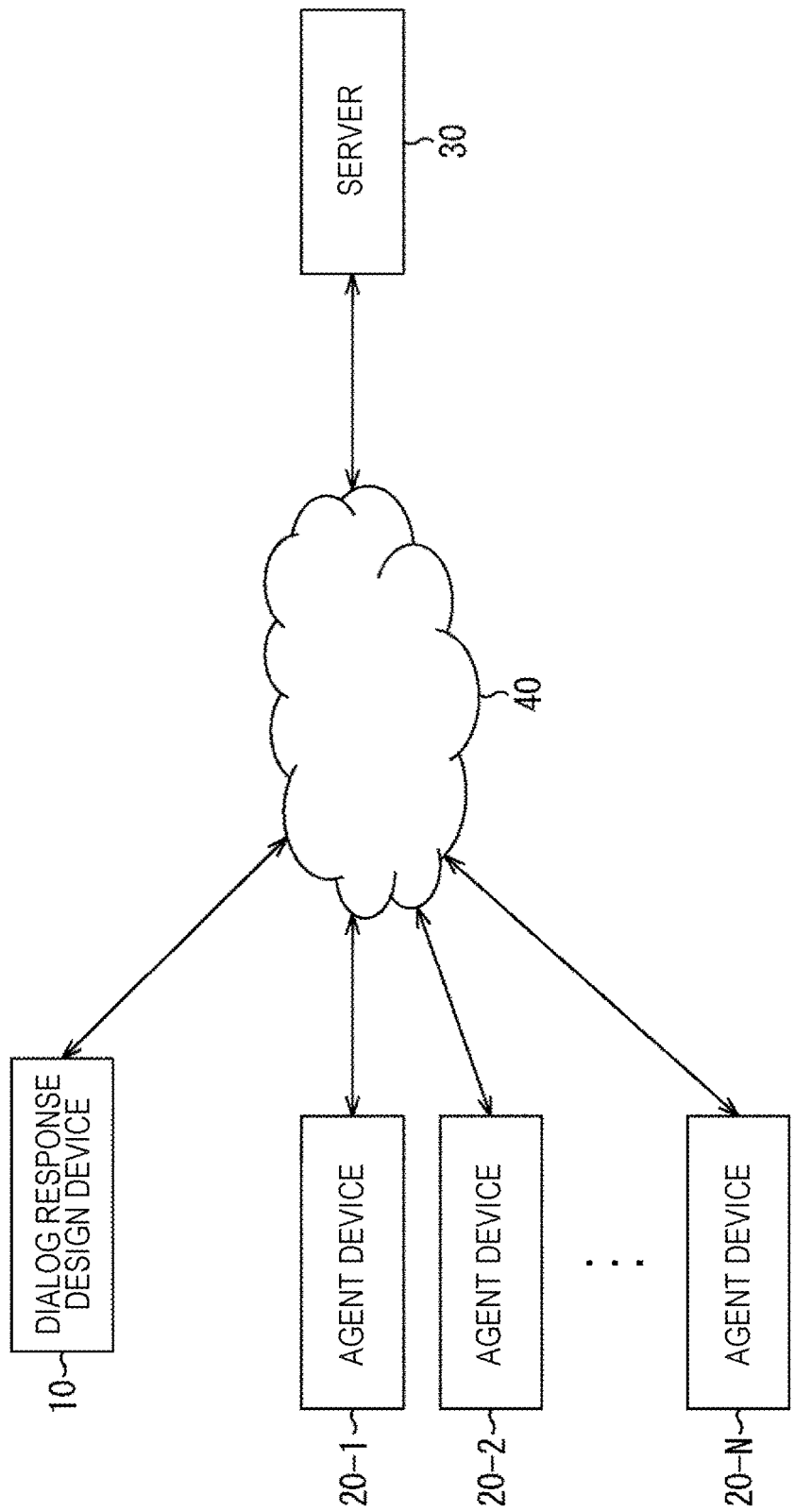
FIG. 14 is a diagram illustrating a configuration example of a network system to which the present technology is applied.

FIG. 14 is a diagram illustrating a configuration example of a network system to which the present technology is applied.

The network system of FIG. 14 includes the dialog response design device 10, the agent devices 20-1 to 20-N, and a server 30, which are mutually connected via a network 40 such as the Internet.

In the dialog response design device 10, (a part or all of) the functions of the dialog response design tool 101 may be provided by the server 30 via the network 40. In addition, the dialog response conversion function group 102 and the dialog response DB 104 may be managed by the server 30, and may be appropriately accessed by (the dialog response design tool 101 of) the dialog response design device 10 via the network 40. In addition, the dialog response conversion learning device 11 may be provided by the server 30.

In the agent device 20, (a part or all of) the functions of the dialog response processing unit 211 may be provided by the server 30 via the network 40. In addition, a part of the functions of the dialog system provided by the agent device 20 (for example, the functions such as voice recognition and semantic analysis) may be provided by the server 30 via the network 40.

In addition, the deployed specific dialog response DB 250 may be managed by the server 30, and may be appropriately accessed by (the dialog response processing unit 211 of) the agent device 20 via the network 40. Furthermore, the agent device 20 may communicate with the dialog response design device 10 via the network 40 to transmit a capability or receive a dialog response.

3. Configuration of Computer

Figure 2:
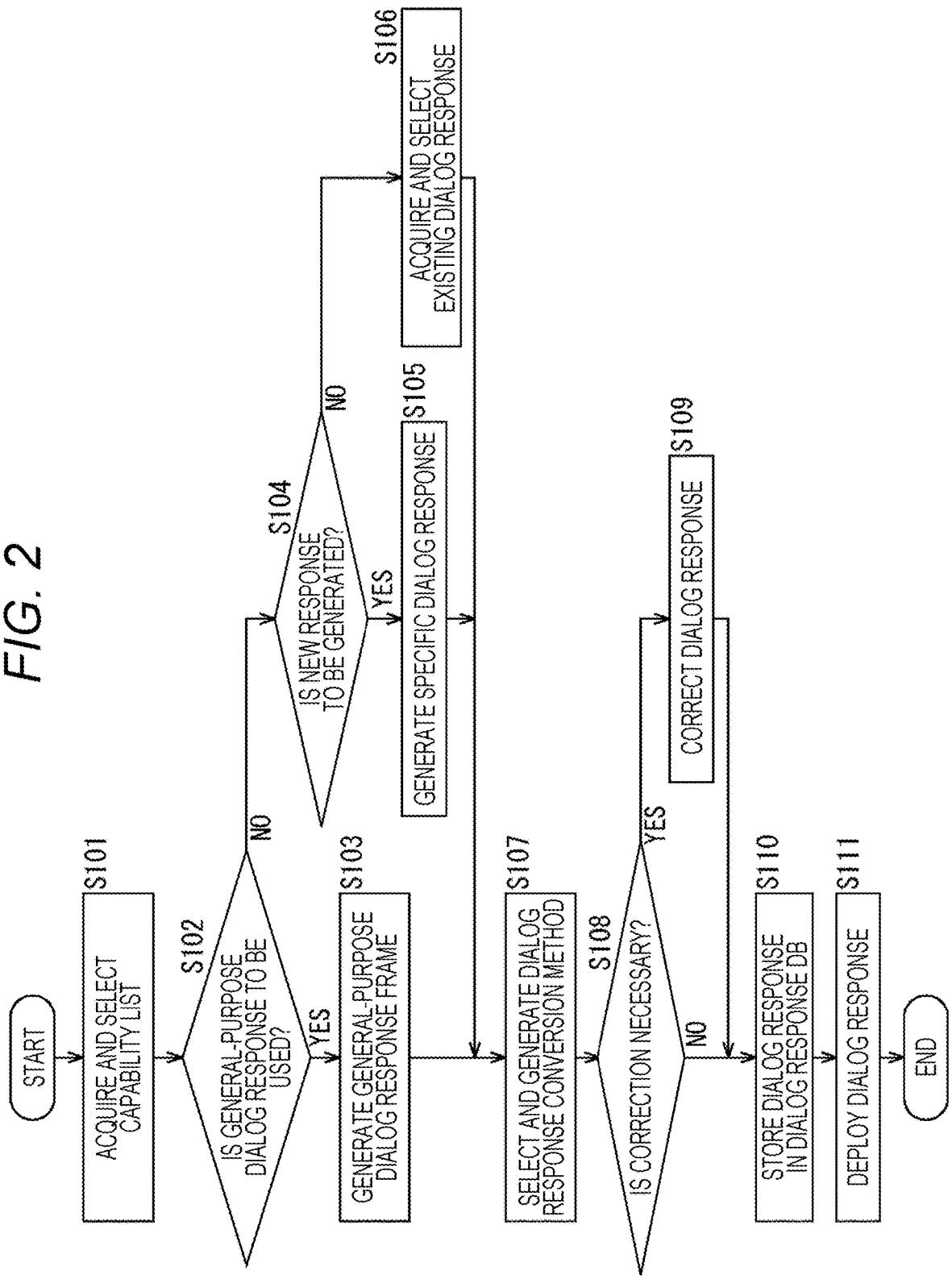
FIG. 2 is a flowchart illustrating a flow of dialog response design processing.
Figure 15:
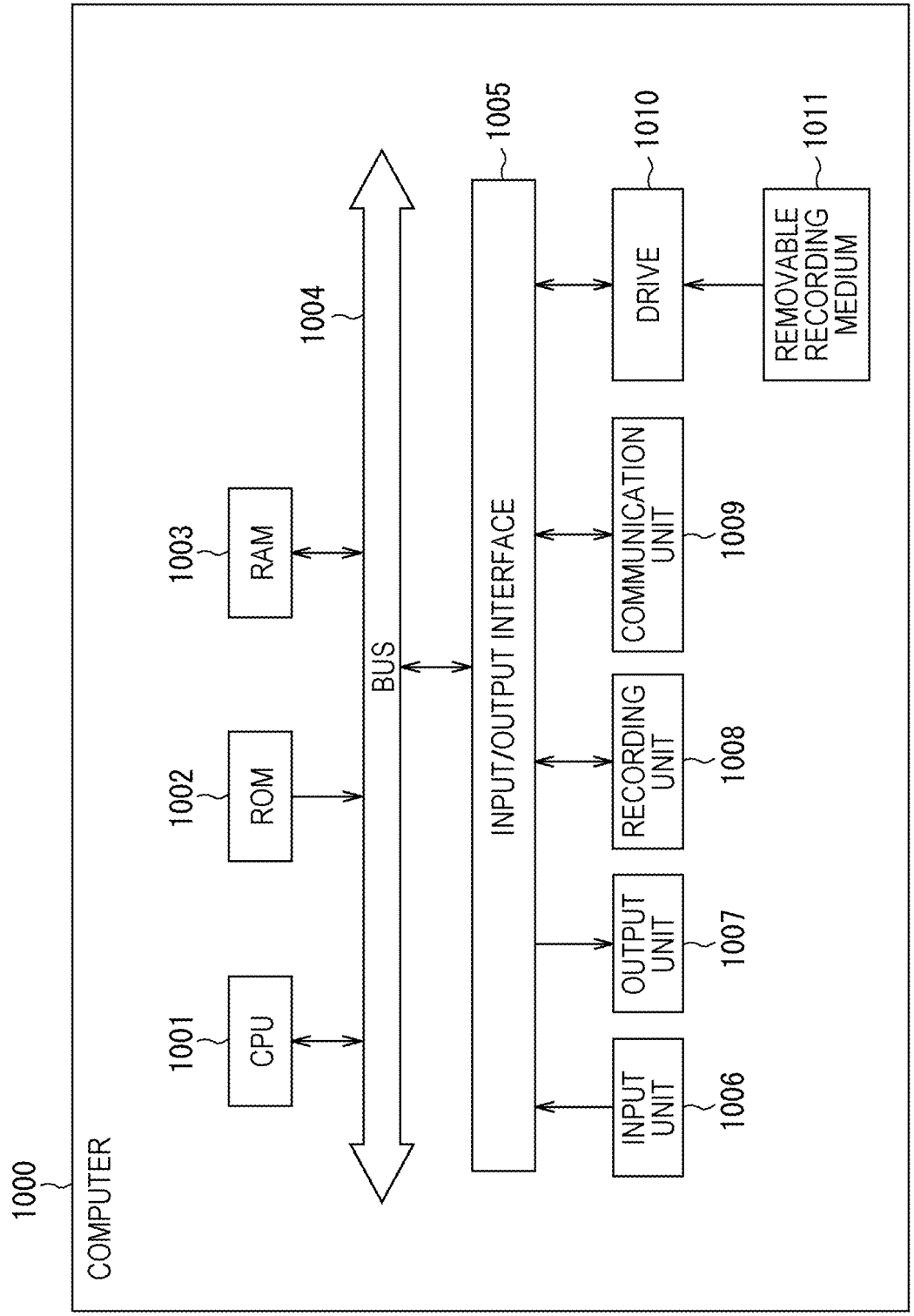
FIG. 15 is a diagram illustrating a configuration example of a computer.

The series of processing described above (for example, the dialog response design processing illustrated in FIG. 2, or the dialog response execution processing illustrated in FIG. 11) can be executed by hardware or software. In a case where the series of processing is executed by software, a program constituting the software is installed in a computer of each device. FIG. 15 is a diagram illustrating a configuration example of hardware of a computer that executes the series of processing described above by a program.

In the computer 1000, the central processing unit (CPU) 1001, a read only memory (ROM) 1002, and a random access memory (RAM) 1003 are mutually connected by a bus 1004. To the bus 1004, an input/output interface 1005 is further connected. To the input/output interface 1005, an input unit 1006, an output unit 1007, the recording unit 1008, the communication unit 1009, and a drive 1010 are connected.

The input unit 1006 includes a microphone, a keyboard, and a mouse. The output unit 1007 includes a speaker and a display. The recording unit 1008 includes a hard disk and a non-volatile memory. The communication unit 1009 includes a network interface. The drive 1010 drives a removable recording medium 1011 such as a magnetic disk, an optical disk, a magneto-optical disk, or a semiconductor memory.

In the computer 1000 configured as described above, the series of processing described above is performed by the CPU 1001 loading a program recorded in the ROM 1002 and the recording unit 1008 into the RAM 1003 via the input/output interface 1005 and the bus 1004 to execute the program.

The program executed by the computer 1000 (CPU 1001) can be provided in a state of being recorded on the removable recording medium 1011 as a package medium or the like, for example. In addition, the program can be provided via a wired or wireless transmission medium such as a local area network, the Internet, or digital satellite broadcasting.

In the computer 1000, the program can be installed in the recording unit 1008 via the input/output interface 1005 by mounting the removable recording medium 1011 on the drive 1010. In addition, the program can be received by the communication unit 1009 and installed in the recording unit 1008 via the wired or wireless transmission medium. Otherwise, the program can be installed in advance in the ROM 1002 or the recording unit 1008.

Here, in the present specification, the processing performed by the computer according to the program does not necessarily need to be performed in time series in the order described as the flowcharts. That is, the processing performed by the computer according to the program also includes processing executed in parallel or individually (for example, parallel processing or processing by an object). In addition, the program may be processed by one computer (processor), or may be processed by a plurality of computers in a distributed manner.

Note that embodiments of the present technology are not limited to the above-described embodiments, and various modifications can be made without departing from the gist of the present technology.

In addition, each step of the processing described above can be executed by one apparatus, or can be shared and executed by a plurality of apparatuses. Furthermore, in a case where a plurality of types of processing is included in one step, the plurality of types of processing included in the one step can be executed by one apparatus, or can be shared and executed by a plurality of apparatuses.

Note that the present technology can include the following configurations.

(1)
An information processing apparatus including
a processing unit that
acquires a capability for each device that outputs a dialog response,
generates the dialog response corresponding to the acquired capability from a dialog response frame used as a seed at a time of generation of the dialog response, and
deploys the generated dialog response to each device.

(2)
The information processing apparatus according to (1), in which
the capability includes interface information regarding an interface of the device and capability information regarding ability of the interface.

(3)
The information processing apparatus according to (1) or (2), in which
the dialog response frame includes a frame described in conformity to a specification of a general-purpose dialog response.

(4)
The information processing apparatus according to (3), in which
the processing unit applies the dialog response frame to a conversion template including a template for conversion for each combination of the capabilities to generate the dialog response.

(5)
The information processing apparatus according to any one of (1) to (4), in which
the processing unit converts the dialog response corresponding to the capability into the dialog response corresponding to another capability.

(6)
The information processing apparatus according to (5), in which
the processing unit converts the dialog response by using a rule-based conversion algorithm or a machine learning-based conversion algorithm.

(7)
The information processing apparatus according to any one of (1) to (6), in which
the processing unit
selects the capability on the basis of context information regarding context, and
generates the dialog response corresponding to the selected capability.

(8)
The information processing apparatus according to any one of (1) to (7), in which
the processing unit
selects the capability corresponding to accessibility, and
generates the dialog response corresponding to the selected capability.

(9)
The information processing apparatus according to any one of (1) to (8), in which
the processing unit includes additional information in the dialog response.

(10)
An information processing method by an information processing apparatus,
the information processing method including:
acquiring a capability for each device that outputs a dialog response;
generating the dialog response corresponding to the acquired capability from a dialog response frame used as a seed at a time of generation of the dialog response; and
deploying the generated dialog response to each device.

(11)
An information processing apparatus including
a processing unit that
acquires, in a case where a dialog response event occurs, the dialog response generated corresponding to a capability from a dialog response frame used as a seed at a time of generation of the dialog response,
acquires context information regarding context,
selects the dialog response that matches the context from the acquired dialog responses, and
outputs the selected dialog response.

(12)
The information processing apparatus according to (11), in which
the capability includes interface information regarding an interface and capability information regarding ability of the interface.

(13)
The information processing apparatus according to (11) or (12), in which
the dialog response frame includes a frame described in conformity to a specification of a general-purpose dialog response.

(14)
The information processing apparatus according to (13), in which
the dialog response is generated by applying the dialog response frame to a conversion template including a template for conversion for each combination of the capabilities.

(15)
The information processing apparatus according to any one of (11) to (14), in which
in a case where one or more of the acquired dialog responses exist, the processing unit selects the dialog response that best matches the context from the acquired dialog responses.

(16)
The information processing apparatus according to any one of (11) to (15), in which
in a case where the acquired dialog responses do not exist, the processing unit generates the dialog response that matches context prepared in advance.

(17)
The information processing apparatus according to any one of (11) to (16), in which
the event includes an utterance of a user, and
the context information includes information regarding a state of the user.

(18)
An information processing method by an information processing apparatus,
the information processing method including:
acquiring, in a case where a dialog response event occurs, the dialog response generated corresponding to a capability from a dialog response frame used as a seed at a time of generation of the dialog response;
acquiring context information regarding context;
selecting the dialog response that matches the context from the acquired dialog responses; and
outputting the selected dialog response.

REFERENCE SIGNS LIST

10 Dialog response design device
11 Dialog response conversion learning device
20, 20-1 to 20-N Agent device
30 Server
40 Network
100 Control unit
101 Dialog response design tool
102 Dialog response conversion function group
102A Rule-based DB
102B Machine learning-based DB
103 Capability list
104 Dialog response DB
150 General-purpose dialog response frame
160 Conversion template
200 Control unit
201 Sensor unit
202 Camera unit
203 Microphone unit
204 Storage unit
205 Communication unit
206 Power supply unit
207 Interface
211 Dialog response processing unit
221 Display
222 Speaker
223 Vibration element
224 Lamp
250 Deployed specific dialog response DB
1000 Computer
1001 CPU

The invention claimed is:

1. An information processing apparatus comprising:
circuitry configured to
acquire a capability for each of agent devices that each output a dialog response, the capability indicating a combination of interfaces available for each of the agent devices;
generate the dialog response corresponding to the capability based on a general-purpose dialog response frame at a time of generation of the dialog response, and
deploy the dialog response to each of the agent devices, wherein
the circuitry is further configured to apply to the general-purpose dialog response frame a conversion template including plural templates that convert values of parameters of the general-purpose dialog response frame into converted forms in accordance with the combination of interfaces available for each of the agent devices, and generate the dialog response for each of the agent devices, by using the converted forms that were converted from the values of the parameters of the general-purpose dialog response frame.

2. The information processing apparatus according to claim 1, wherein the capability includes interface information regarding the combination of interfaces for each of the agent devices and capability information regarding ability of the interfaces.

3. The information processing apparatus according to claim 1, wherein the circuitry is further configured to convert the dialog response corresponding to the capability into the dialog response corresponding to another capability.

4. The information processing apparatus according to claim 3, wherein the circuitry is further configured to convert the dialog response by using a rule-based conversion algorithm or a machine learning-based conversion algorithm.

5. The information processing apparatus according to claim 1, wherein the circuitry is further configured to select one or more interfaces from among the combination of interfaces on the basis of context information regarding context about a user of the agent devices, and generate the dialog response corresponding to the interfaces that were selected.

6. The information processing apparatus according to claim 1, wherein the circuitry is further configured to select one or more interfaces from among the combination of interfaces corresponding to accessibility, and generate the dialog response corresponding to the interfaces that were selected.

7. The information processing apparatus according to claim 1, wherein the circuitry is further configured to include additional information in the dialog response.

8. An information processing method by an information processing apparatus, the information processing method comprising:

acquiring a capability for each of agent devices that each output a dialog response, the capability indicating a combination of interfaces available for each of the agent devices;

generating the dialog response corresponding to the capability based on a general-purpose dialog response frame at a time of generation of the dialog response; and deploying the dialog response to each of the agent devices, wherein the method further comprises applying to the general-purpose dialog response frame a conversion template including plural templates that convert values of parameters of the general-purpose dialog response frame into converted forms in accordance with the combination of interfaces available for each of the agent devices, and generating the dialog response for each of the agent devices, by using the converted folnis that were converted from the values of the parameters of the general-purpose dialog response frame.

* * * * *